US012632263B2

(12) United States Patent
Lee et al.

(10) Patent No.: US 12,632,263 B2
(45) Date of Patent: May 19, 2026

(54) PIPELINED PROCESSOR ARCHITECTURE WITH CONFIGURABLE GROUPING OF PROCESSOR ELEMENTS

(71) Applicant: Marvell Asia Pte Ltd, Singapore (SG)

(72) Inventors: Sean Lee, San Jose, CA (US); Young-Ta Wu, Fremont, CA (US)

(73) Assignee: Marvell Asia Pte Ltd, Singapore (SG)

( * ) Notice: Subject to any disclaimer, the term of this patent is extended or adjusted under 35 U.S.C. 154(b) by 55 days.

(21) Appl. No.: 18/612,608

(22) Filed: Mar. 21, 2024

(65) Prior Publication Data

US 2024/0320011 A1 Sep. 26, 2024

Related U.S. Application Data

(60) Provisional application No. 63/453,505, filed on Mar. 21, 2023.

(30) Foreign Application Priority Data

Jul. 14, 2023 (EP) ...................................... 23185526

(51) Int. Cl.
 *G06F 9/38* (2018.01)
 *G06F 17/15* (2006.01)
(52) U.S. Cl.
 CPC .......... *G06F 9/3867* (2013.01); *G06F 9/3856* (2023.08)
(58) Field of Classification Search
 CPC .............................. G06F 9/3867; G06F 9/3856
 See application file for complete search history.

(56) References Cited

U.S. PATENT DOCUMENTS 5,721,855 A * 2/1998 Hinton .................... G06F 9/322
 712/E9.055
6,405,303 B1 * 6/2002 Miller ................... G06F 9/3836
 712/213

(Continued)

OTHER PUBLICATIONS

"Extended European Search Report", EP Application No. 23185526. 3, Mar. 12, 2024, 12 pages.

(Continued)

*Primary Examiner* — Hyun Nam
(74) *Attorney, Agent, or Firm* — Colby Nipper PLLC

(57) ABSTRACT

The present disclosure describes apparatuses and methods for implementing a pipelined processor with configurable grouping of processor elements. In aspects, an apparatus comprises a host interface configured for communication with a host system, a media interface configured to enable access to storage media, and a plurality of processor elements operably coupled to at least one of the host interface and the media interface. The plurality of processor elements is organized into multiple stages of a pipelined processor for processing data access commands associated with the host system. In various implementations, the plurality of processor elements can be selectively grouped to form the multiple stages of the pipelined processor and loaded with microcode to implement respective functions of each stage of the pipelined processor. By so doing, the pipelined processor may be configured based on various parameters to improve processing performance when processing the data access commands of the host system.

20 Claims, 18 Drawing Sheets

(56) References Cited

U.S. PATENT DOCUMENTS

| | | | | |
|---|---|---|---|---|
| 6,438,664 | B1 * | 8/2002 | McGrath | G06F 9/24 |
| | | | | 712/E9.007 |
| 6,553,485 | B2 * | 4/2003 | Janik | G06F 9/3867 |
| | | | | 712/42 |
| 7,114,058 | B1 * | 9/2006 | Trivedi | G06F 9/3853 |
| | | | | 712/E9.034 |
| 10,282,103 | B1 | 5/2019 | Stone et al. | |
| 2007/0180310 | A1 | 8/2007 | Johnson et al. | |
| 2009/0168525 | A1 | 7/2009 | Olbrich et al. | |
| 2021/0048991 | A1 * | 2/2021 | Tanner | G06F 8/4442 |
| 2021/0064987 | A1 * | 3/2021 | Springer | G06N 3/063 |
| 2021/0109758 | A1 * | 4/2021 | Francois | G06F 9/3836 |
| 2021/0191724 | A1 * | 6/2021 | Pal | G06F 9/3001 |
| 2022/0075627 | A1 * | 3/2022 | Foley | G06F 9/22 |
| 2022/0100680 | A1 * | 3/2022 | Chrysos | G06F 13/4027 |
| 2023/0038919 | A1 * | 2/2023 | Wesslén | G06F 9/267 |
| 2024/0320011 | A1 * | 9/2024 | Lee | G06F 15/7807 |
| 2025/0362884 | A1 * | 11/2025 | Sangeneni | G06F 8/34 |

OTHER PUBLICATIONS

"Partial European Search Report", EP Application No. 23185526.3, Dec. 19, 2023, 14 pages.
"Foreign Office Action", EP Application No. 23185526.3, May 15, 2025, 9 pages.

* cited by examiner

Figure 1:
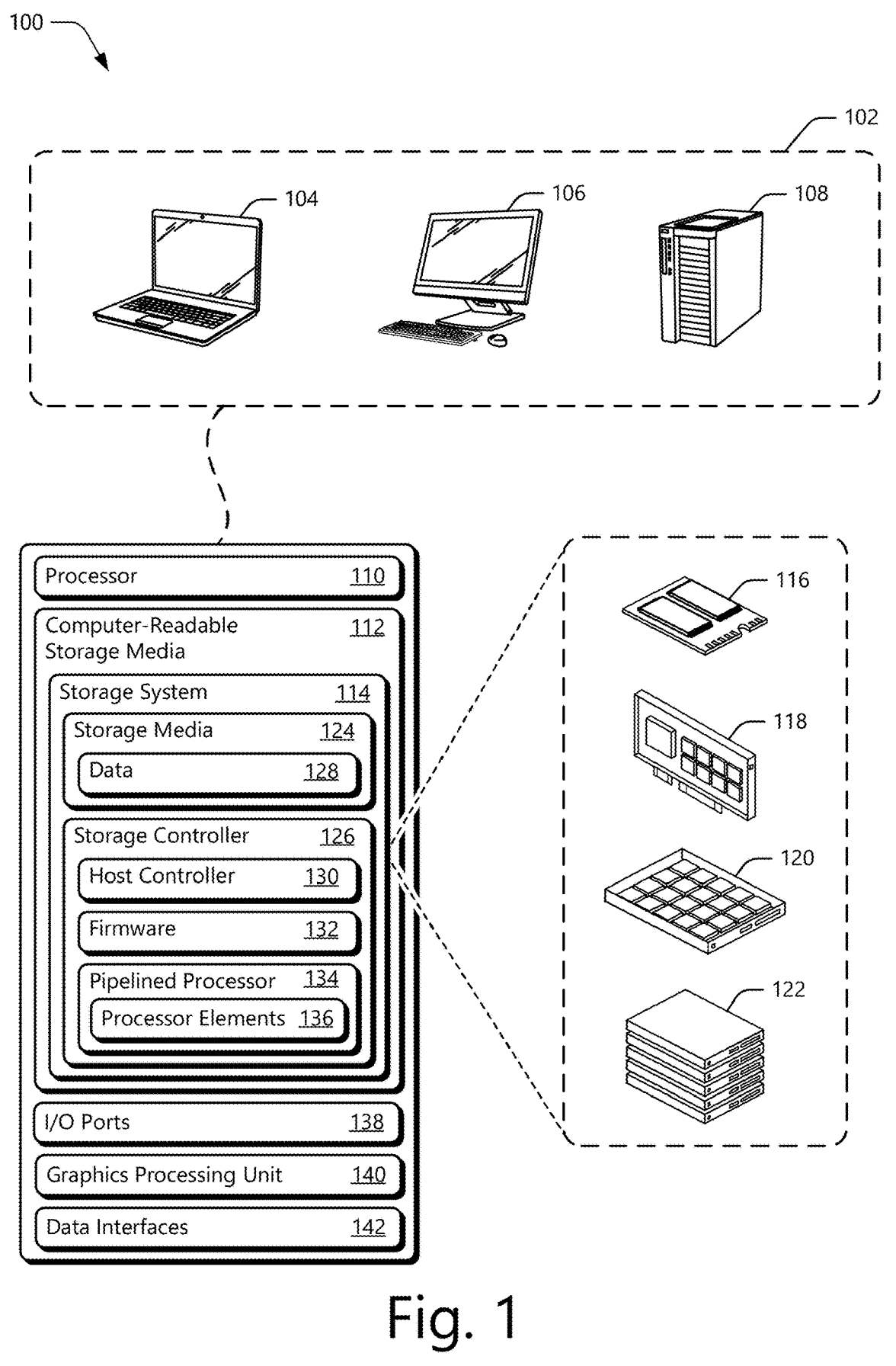

100

102

104

106

108

Processor 110

Computer-Readable 112
Storage Media

Storage System 114

Storage Media 124

Data 128

Storage Controller 126

Host Controller 130

Firmware 132

Pipelined Processor 134

Processor Elements 136

I/O Ports 138

Graphics Processing Unit 140

Data Interfaces 142

| Stage 5 602-5 | CMD Forward 638 | 484 ns | } 1207 ns | PE 136 | x 2 | Group F 640 |
| | Construct Info 636 | 723 ns | | | | |

| Stage 4 602-4 | L2P Search 632 | 2.1 ms | } 4.8 ms | PE 136 | x 8 | Group E 634 |
| | CMD Check 4 630 | 2.7 ms | | | | |

| Stage 3 602-3 | Range Search 626 | 3.8 ms | } 4389 ns | PE 136 | x 4 | Group D 628 |
| | Slice Distribute 624 | 589 ns | | | | |

| Stage 2 602-2 | Overlap Check 620 | 3.6 ms | | PE 136 | x 6 | Group C 622 |

| Stage 1 602-1 | LBA Remap 616 | 865 ns | } 1789 ns | PE 136 | x 3 | Group B 618 |
| | CMD Check 3 614 | 254 ns | | | | |
| | CMD Check 2 612 | 521 ns | | | | |
| | CMD Check 1 610 | 149 ns | | | | |

| Stage 0 602-0 | CMD Check 0 606 | 181 ns | } 584 ns | PE 136 | x 1 | Group A 608 |
| | CMD Launch 604 | 403 ns | | | | |

Performance Target = 600 ns per
pipeline stage

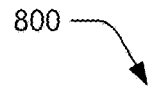
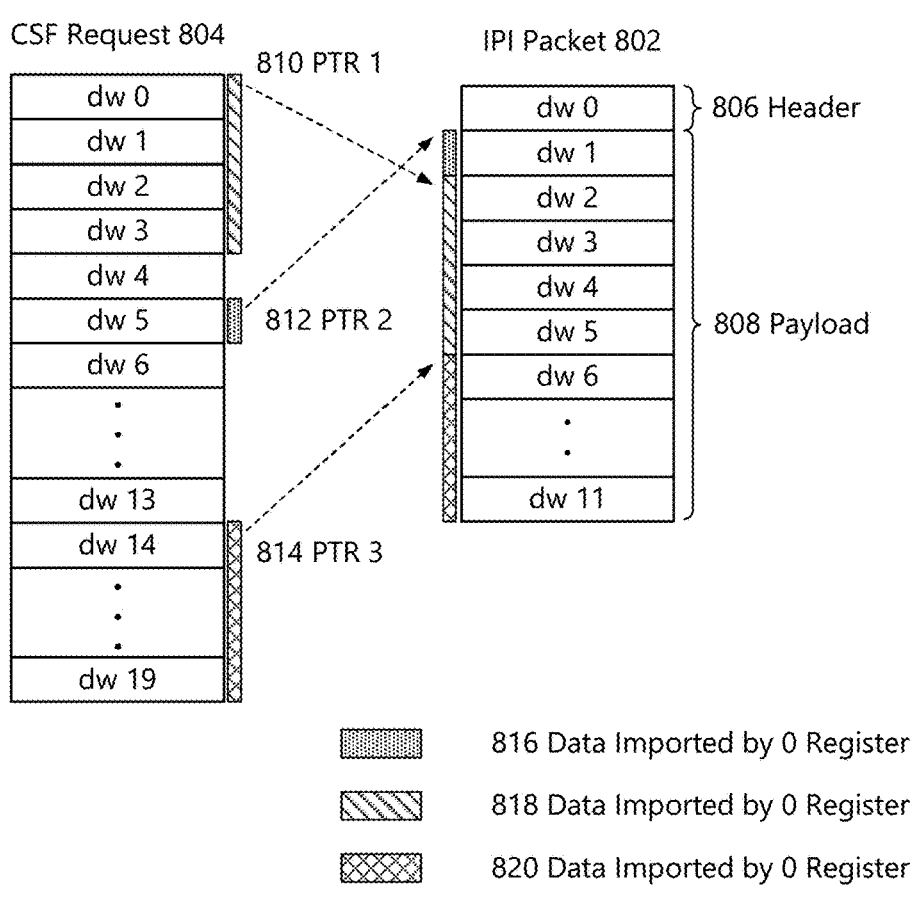
Fig. 8

900
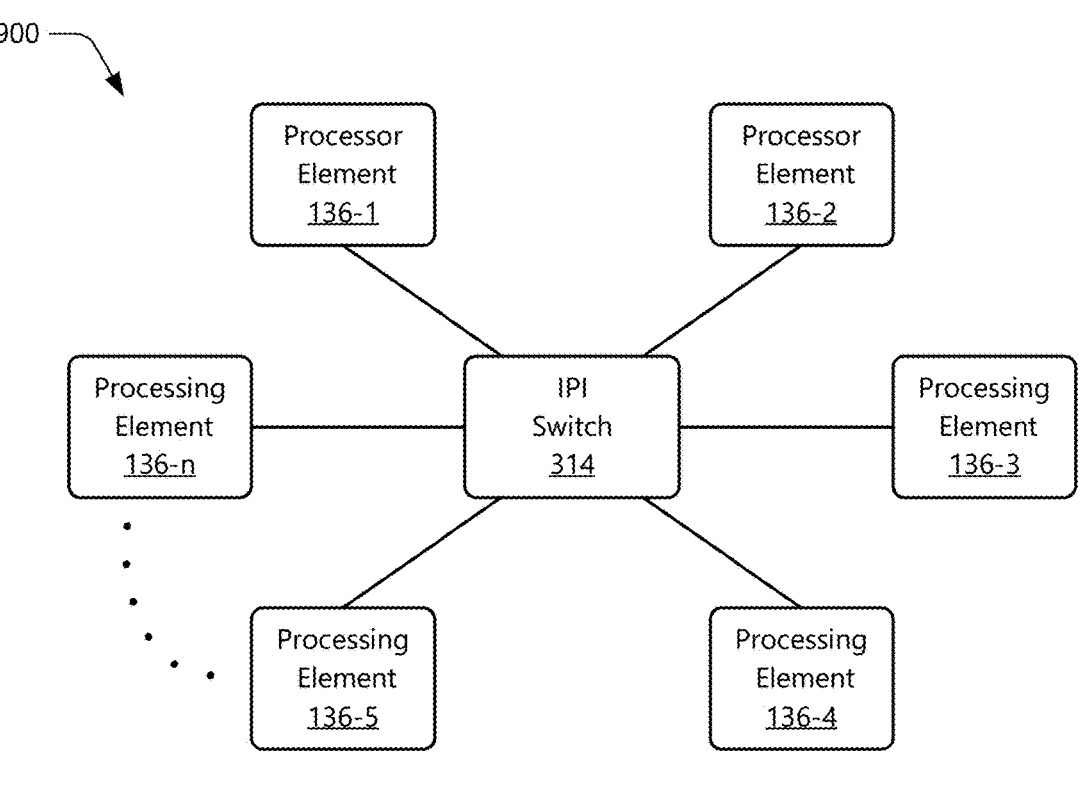
901
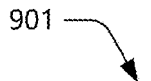
| IPI Packet 902 |
| --- |
| Dword 0 |
| Dword 1 |
| Dword 2 |
| . |
| . |
| . |
| Dword 9 |
| Dword 10 |
| Dword 11 |
msb                                                                                     lsb
| InstPtr | EGID | RGID | CMDidx |
▨▨▨▨▨  904 Routing Information
▨▨▨▨▨  906 Execution Information
RGID  = 908 Routing Group ID
EGID  = 910 Execution Group ID
InstPtr  = 912 Execution Instruction Pointer
CMDidx  = 914 Command Index
Fig. 9

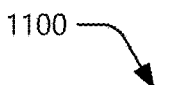

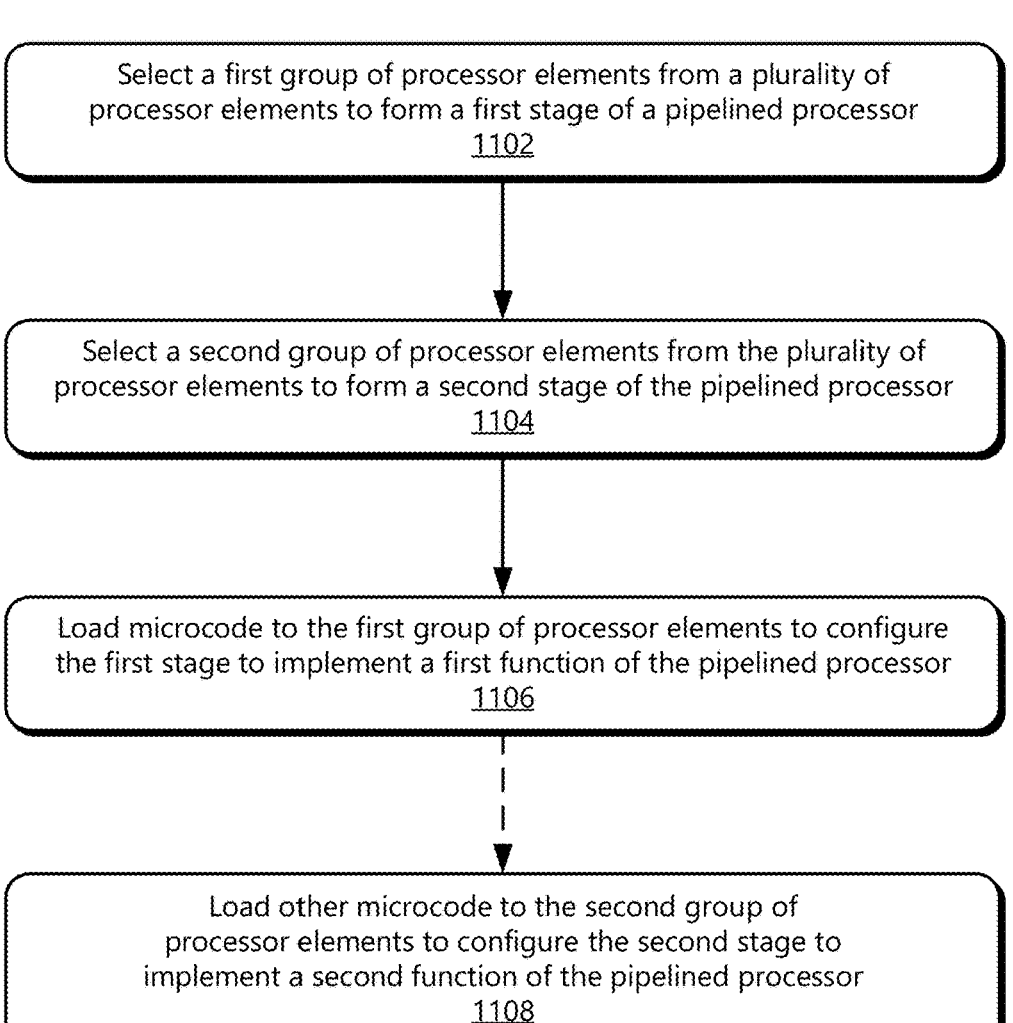

1100

Select a first group of processor elements from a plurality of processor elements to form a first stage of a pipelined processor
1102

Select a second group of processor elements from the plurality of processor elements to form a second stage of the pipelined processor
1104

Load microcode to the first group of processor elements to configure the first stage to implement a first function of the pipelined processor
1106

Load other microcode to the second group of processor elements to configure the second stage to implement a second function of the pipelined processor
1108

Fig. 11

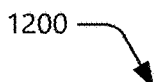

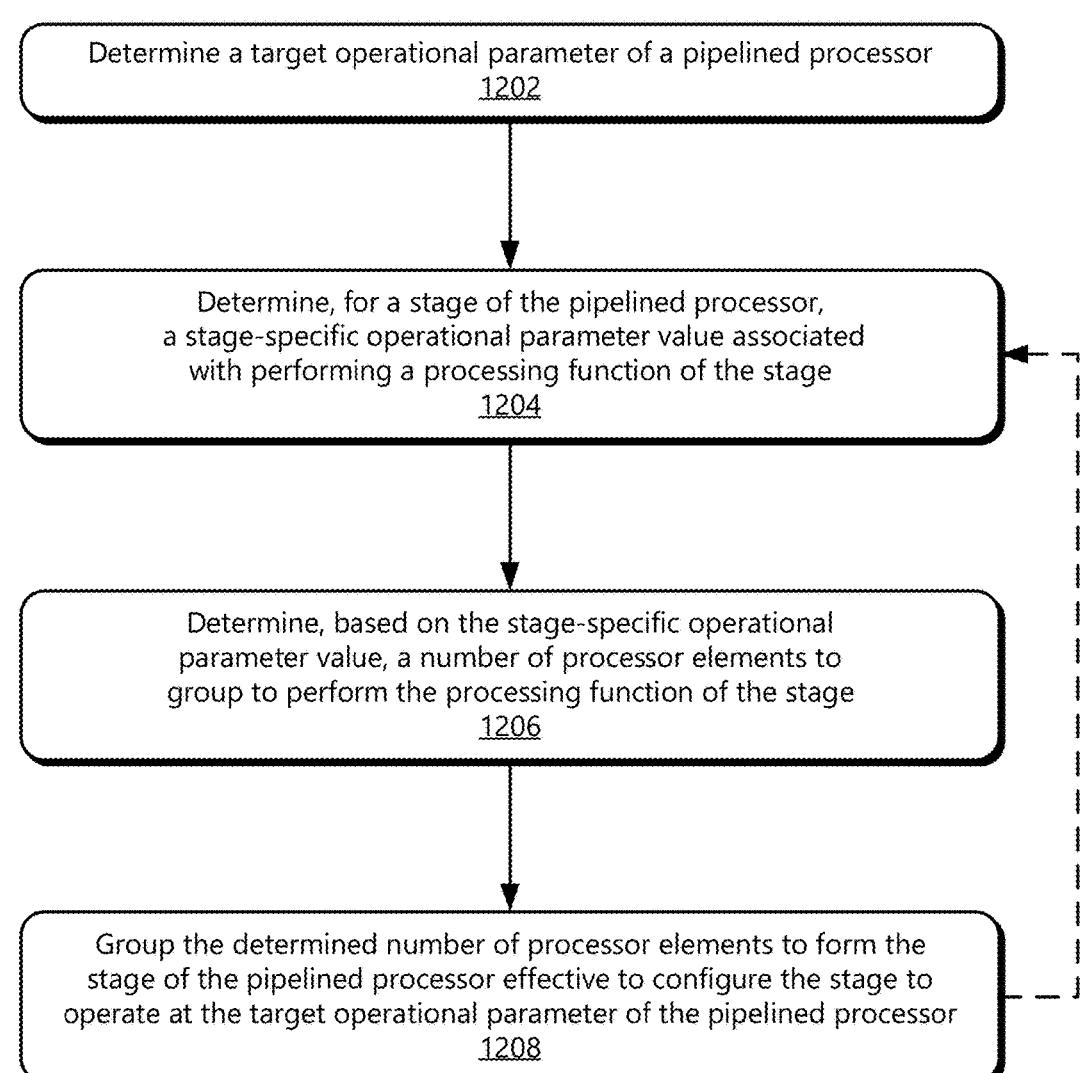

1200

Determine a target operational parameter of a pipelined processor
1202

Determine, for a stage of the pipelined processor,
a stage-specific operational parameter value associated
with performing a processing function of the stage
1204

Determine, based on the stage-specific operational
parameter value, a number of processor elements to
group to perform the processing function of the stage
1206

Group the determined number of processor elements to form the
stage of the pipelined processor effective to configure the stage to
operate at the target operational parameter of the pipelined processor
1208

Fig. 12

1300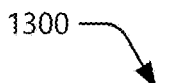

Receive, from an output buffer of a processor element,
an indication that a packet is queued for routing
1302

Query statuses of respective input buffers of multiple
processor elements associated with a processor element
group identifier to which the packet is addressed
1304

Query available depth from the respective input
buffers of the multiple processor elements
1306

Select one of the multiple processor elements as a destination
for the packet based on the respective status and/or available depth
of the respective input buffers of the multiple processor elements
1308

Route the packet from the output buffer of the processor
element to the input buffer of the selected processor element
associated with the processor element group identifier
1310

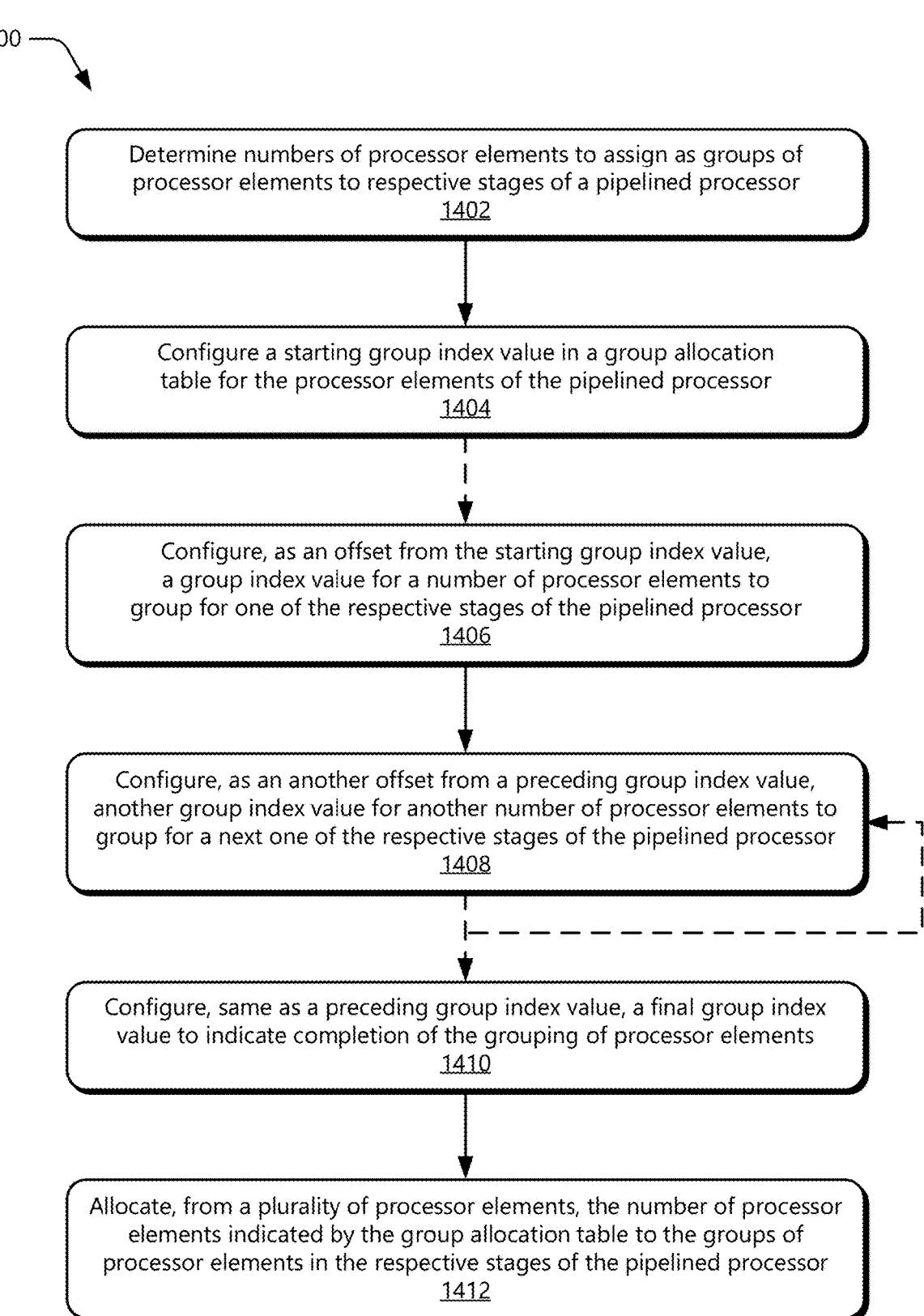

Determine numbers of processor elements to assign as groups of
processor elements to respective stages of a pipelined processor
1402

Configure a starting group index value in a group allocation
table for the processor elements of the pipelined processor
1404

Configure, as an offset from the starting group index value,
a group index value for a number of processor elements to
group for one of the respective stages of the pipelined processor
1406

Configure, as an another offset from a preceding group index value,
another group index value for another number of processor elements to
group for a next one of the respective stages of the pipelined processor
1408

Configure, same as a preceding group index value, a final group index
value to indicate completion of the grouping of processor elements
1410

Allocate, from a plurality of processor elements, the number of processor
elements indicated by the group allocation table to the groups of
processor elements in the respective stages of the pipelined processor
1412

Fig. 14

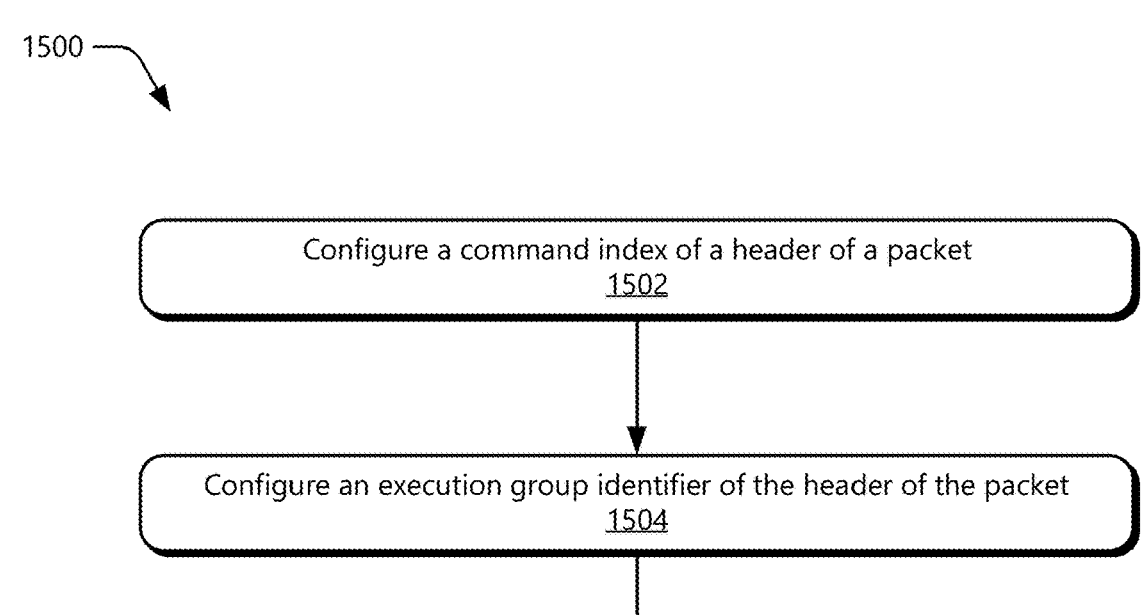

1500

Configure a command index of a header of a packet
1502

Configure an execution group identifier of the header of the packet
1504

Configure a routing group identifier of the header of the packet
1506

Configure an instruction pointer of the header of the packet
1508

Set an Input/Output management field of the packet to
select to use an alternative command index, execution group
identifier, routing group identifier, or instructions pointer
1510

Send the packet to an output buffer of a processor element for
routing by an inter-processor switch based on the header of the packet
1512

Fig. 15

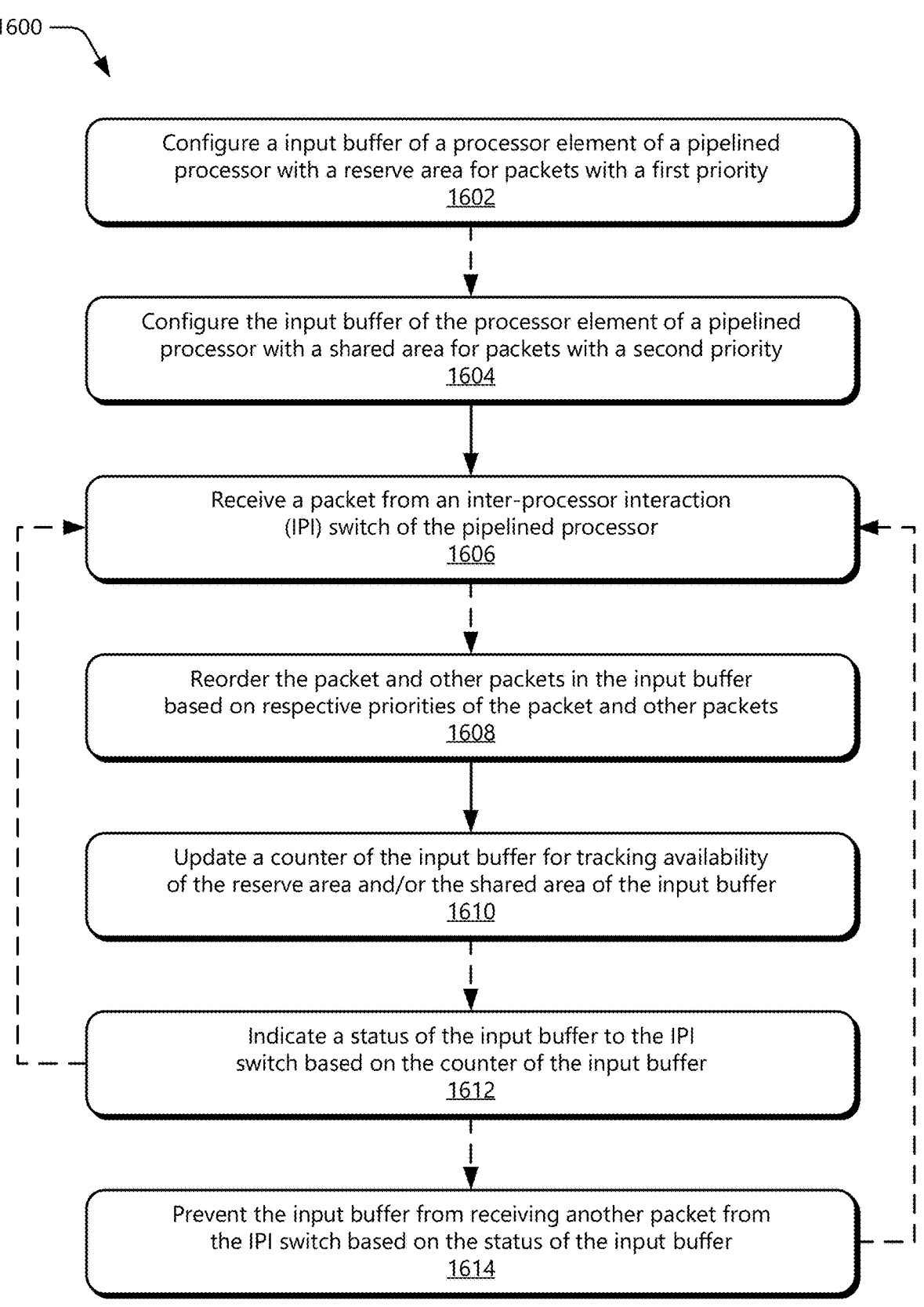

1600

Configure a input buffer of a processor element of a pipelined processor with a reserve area for packets with a first priority
1602

Configure the input buffer of the processor element of a pipelined processor with a shared area for packets with a second priority
1604

Receive a packet from an inter-processor interaction (IPI) switch of the pipelined processor
1606

Reorder the packet and other packets in the input buffer based on respective priorities of the packet and other packets
1608

Update a counter of the input buffer for tracking availability of the reserve area and/or the shared area of the input buffer
1610

Indicate a status of the input buffer to the IPI switch based on the counter of the input buffer
1612

Prevent the input buffer from receiving another packet from the IPI switch based on the status of the input buffer
1614

Fig. 16

PIPELINED PROCESSOR ARCHITECTURE WITH CONFIGURABLE GROUPING OF PROCESSOR ELEMENTS

CROSS-REFERENCE TO RELATED APPLICATION(S)

This application claims priority to European Patent Application Serial No. 23185526.3, filed on Jul. 14, 2023, which in turn claims priority to U.S. Provisional Patent Application Ser. No. 63/453,505 filed on Mar. 21, 2023, the disclosures of which are incorporated by reference herein in their entireties.

BACKGROUND

Many computing and electronic devices include non-volatile memory for storing software, applications, or data of the device. Additionally, most users stream data or access services with their devices, such as multimedia content or social media applications, over data networks from various locations or on the move. With users' ever-increasing demand for data and services, storage providers have scaled up capacity and performance of storage drives to support the data access associated with these activities of users and other data storage clients. Typically, a storage drive of a device includes storage media to which data of the device is written and read from. To do so, the device may issue data access requests to the storage drive, which in turn writes the data to or reads the data from the storage media as specified by each request. Thus, storage drive performance generally depends on a rate at which the storage drive is able to complete the data access requests of the device or the storage client.

Generally, hardware of a storage drive is designed to process an average flow of data access requests as quickly as possible. Access patterns of the storage media, however, can vary over a wide array of usage patterns. As such, the hardware of conventional storage drives may not be optimized for access request traffic patterns or flows associated with different applications, user types, multitasking, storage network topologies, and so forth. For example, a large volume of one type of access request may overload the storage drive hardware and create a bottleneck in request processing that slows processing of all other access requests received by the storage drive. Accordingly, when storage drives are deployed with a static hardware configuration, overall storage drive performance is often less than optimal because the storage drive is unable to efficiently handle different types of access request traffic patterns.

SUMMARY

This summary is provided to introduce subject matter that is further described in the Detailed Description and Drawings. Accordingly, this Summary should not be considered to describe essential features nor used to limit the scope of the claimed subject matter.

In some aspects, an apparatus includes a host interface configured for communication with a host system, a media interface configured to enable access to storage media, and a plurality of processor elements operably coupled to at least one of the host interface and the media interface. The plurality of processor elements is organized into multiple stages of a pipelined processor for processing data access commands associated with the host system, with at least two of the multiple stages configured to implement a different function to process the data access commands.

In other aspects, a method is implemented for configuring a plurality of processor elements of a storage controller to form a pipelined processor for processing data access commands of a host system or other commands of the storage controller. The method includes selecting a first group of processor elements of the plurality of processor elements to form a first stage of the pipelined processor and selecting a second group of the processor elements of the plurality of processor elements to form a second stage of the pipelined processor. The method then loads microcode to the first group of processor elements to configure the first stage of the pipelined processor to implement a first function of the pipelined processor, the first function of the first stage being different from a second function of the second stage.

In yet other aspects, a storage controller includes an inter-processor interaction (IPI) switch coupled to multiple processor elements of a pipelined processor of the storage controller. The IPI may be configured to receive, from an output buffer of one of the processor elements, an indication that a packet is queued for routing. The IPI switch queries or receives statuses of respective input buffers of other of the processor elements associated with a processor element group identifier to which the packet is addressed. The IPI switch may also query or determine an available depth of the respective input buffers of the processor elements. The IPI switch selects one of the processor elements as a destination for the packet based on the respective status or available depth of the respective input buffers of the processor elements. The IPI switch then routes the packet from the output buffer of the processor element to the input buffer of the selected processor element associated with the processor element group identifier.

In other aspects, a processor element includes a first-in, first-out (FIFO) input buffer that is configured with a reserved area for packets of a first priority and a shared area for packets of the first priority or other priorities. The input buffer may receive a packet from an IPI switch of a pipelined processor. Based on respective priorities of the packet and other packets stored by the input buffer, the input buffer may re-order the packet and the other packets. A counter for tracking availability of the input buffer is then updated to reflect changes in availability of the reserved area and/or shared area of the input buffer. A status of the input buffer may be indicated to the IPI switch, and in some cases may indicate a lack of availability in the reserved area and/or shared area to the IPI switch. By so doing, the input buffer may be prevented from receiving subsequent packets until the reserved area and/or shared area are available again (e.g., when packets are processed out of the input buffer).

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of a pipelined processor architecture with configurable grouping of processor elements are set forth in the accompanying figures and the detailed description below. In the figures, the left-most digit of a reference number identifies the figure in which the reference number first appears. The use of the same reference numbers in different instances in the description and the figures indicates like elements:

FIG. 1 illustrates an example operating environment having systems in which a pipelined processor architecture with configurable grouping of processor elements is implemented in accordance with one or more aspects;

FIG. 8 illustrates an example of an inter-processor interaction packet configured in accordance with one or more aspects;

FIG. 9 illustrates an example of an inter-processor interaction switch configuration and an example inter-processor interaction packet configuration;

FIG. 11 depicts an example method for grouping processor elements to form stages of a pipelined processor in accordance with one or more aspects;

FIG. 12 depicts an example method for grouping processor elements of pipeline processor stages based on a target operational parameter of the pipelined processor in accordance with one or more aspects;

FIG. 13 depicts an example method for routing interprocessor packets of a pipelined processor between processor elements or other components of a storage controller in accordance with one or more aspects;

FIG. 14 depicts an example method for configuring a group allocation table to allocate numbers of processor elements to respective processing groups of a pipelined processor;

FIG. 15 depicts an example method for constructing inter-processor interaction packets in accordance with one or more aspects;

FIG. 16 depicts an example method for managing packet flow through an input buffer in accordance with one or more aspects in accordance with one or more aspects;

DETAILED DESCRIPTION

Figure 2:
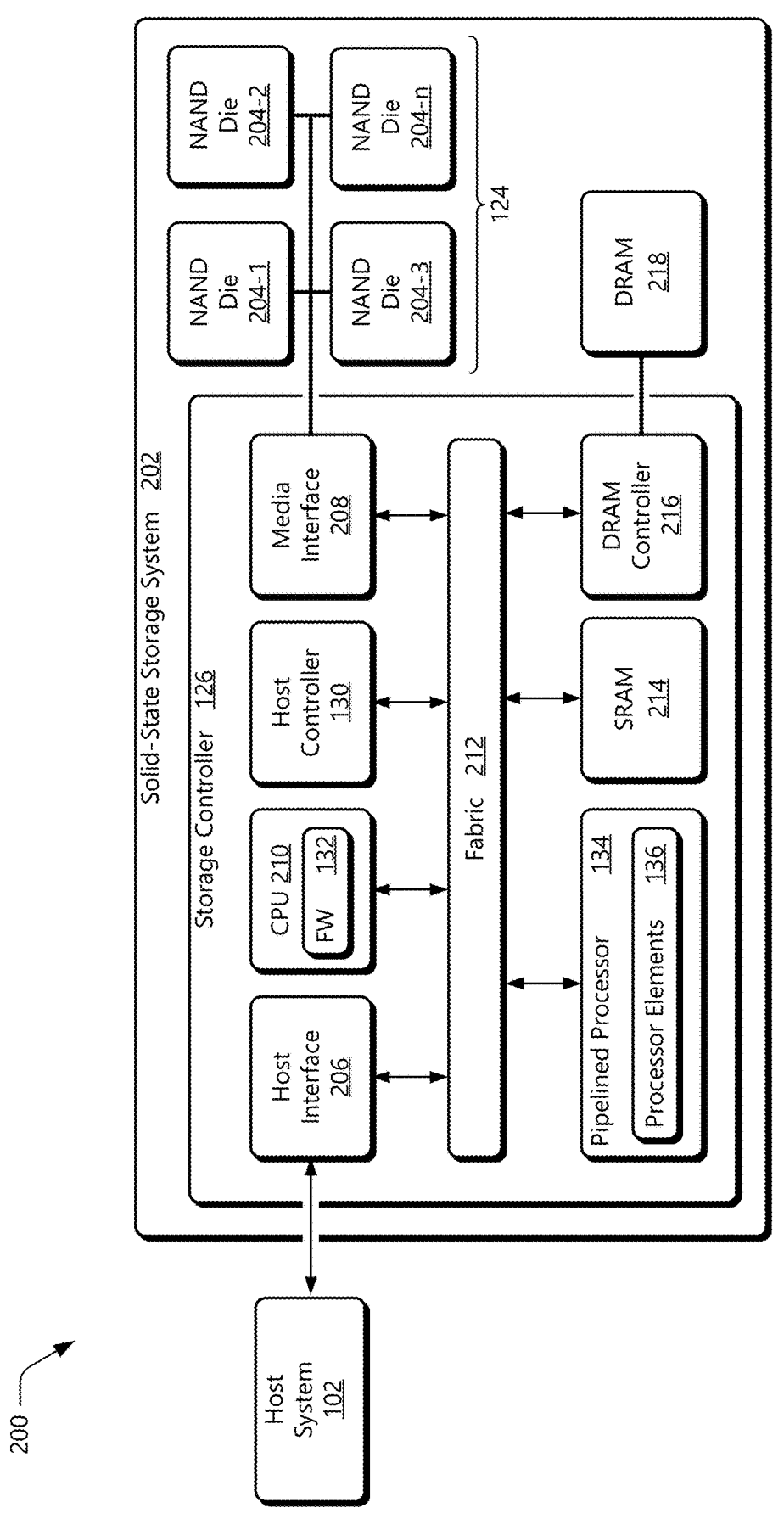
FIG. 2 illustrates an example configuration of storage system components that may implement aspects of a pipelined processor architecture with configurable grouping of processor elements.

Generally, hardware of a storage media drive is designed to process an average flow or typical distribution of data access requests. Access patterns of the storage media, however, generally vary over a wide array of usage patterns. As such, static hardware designs of preceding storage drives may not be optimized for access request traffic patterns or flows associated with different applications, user types, multitasking, storage network topologies, and so forth. For example, a large volume of one type of access request (e.g., data encryption or error correction) may overload a portion the storage drive hardware and create a bottleneck in access request processing that slows processing of all other access requests received by the storage drive. Additionally, as host transport protocols of storage controllers increase in complexity and performance requirements become higher, firmware of the storage controller can become a bottleneck of a storage media system. Preceding solutions, such as increasing a number of processing cores of the storage controller, also increase silicon area requirements and power consumption of the storage controller, as well as lead to other inefficiencies associated with the static, suboptimal hardware designs. This may result in increased latency, reduced throughput, or increased size or power consumption of the storage controller, which may degrade storage drive performance and may result in poor user experience.

This disclosure describes apparatuses and techniques of a pipelined processor architecture with configurable grouping of processor elements. In contrast with preceding techniques of storage media controller design, the described apparatuses and techniques may implement a pipelined processor architecture with configurable grouping of processor elements, which may offload various workloads and tasks from firmware executed on a main processor of a storage controller for processing and analyzing host commands processed by the storage controller. In aspects, the groups of processor elements of the pipelined processor architecture may be configured based on estimated performance of the groups of processor elements such that the storage controller implementing the pipelined processor can achieve the desired levels of performance. Generally, the pipelined processor architecture may be implemented as a microcode driven hardware accelerator or staged processing pipeline, which includes multiple small processors or cores that may be selectively grouped and/or configured depending on workload or target performance metrics of the storage controller. For example, the processors (e.g., processor elements or processor units) of the pipelined processor can be specialized for data manipulations, data checking, basic mathematic operations, and so forth. In aspects, the processors can be selectively grouped (e.g., based on expected workload, bandwidth, or latency targets) and managed in a pipeline fashion to optimize storage controller performance without significant increases in silicon area and power consumption. With an associated inter-processor interaction switch, configured to support the pipelined processor architecture, the pipelined processor architecture may ensure the efficiency of internal inter-processor communication. In aspects, the pipelined processor architecture communicates with and drives hardware accelerators through dedicated local interfaces. The pipelined processor architecture may also access the system memory through an external memory port (e.g., Advanced eXtensible Interface (AXI) port) and communicate with the main processor of the storage controller through one of the attached hardware accelerators.

In various implementations, the pipelined processor architecture is a multi-processor system that includes multiple processor elements (or processor units), an inter-processor interaction switch (IPI switch), a processor launcher (launcher), and a command memory. This configurable architecture is designed to offload command and packet processing workload from the firmware of a storage controller. Thus, the pipelined processor as described herein can handle most of the command processing tasks that are typically performed by a main processor or central processing unit (CPU) of a system-on-chip or storage controller. Generally, the tasks offloaded to the pipelined processor may include any operation before or after the command activation, such as validation of the command content, resource management, LBA remapping, or the like. In aspects, a host command is registered to the pipelined processor before the processor can process the host command. To do so, registration of the host command may be initiated when a host controller of the storage controller delivers the host command information, along with a host command index assigned by the host controller, to the launcher of the pipelined processor.

In some aspects, this host command index (e.g., CMD index) is a unique ID assigned to the host command by the host controller. The host controller can use the command index to manage the command information of the host command as the command is processed by components of the storage controller. Because the pipelined processor may implement a similar mechanism as the host controller, the processor elements of the pipelined processor can directly use the command index to track and identify the host command within the pipelined processor and other components of the architecture described herein. Thus, from a perspective of the pipelined processor, a life span of a host command starts when the command is registered to the pipelined processor and ends when another host command that uses a same command index is registered to the pipelined processor. Thus, the firmware should ensure that the host controller does not release and reuse a command index until the pipelined processor has completed all of its operations that are related to the host command to which the command index is associated.

In aspects, the pipelined processor architecture with configurable grouping of processor elements is implemented by a storage controller that includes a host controller, storage controller firmware (firmware), and a storage interface to storage media. Various storage controller modules or functions may be implemented through any suitable combination of IP blocks, firmware, and/or associated hardware. Generally, the host controller (HCT) or non-volatile memory express (NVMe) IP of the storage controller can be implemented as a hardware module that assists the firmware to control and initiate host activities, e.g., with a host system or host device operably coupled to the storage controller. The host controller may be implemented based on or operate in compliance with any suitable version of the NVMe specification. The pipelined processor architecture may be configured to offload or assist with many complicated data or media access operations, such as data encryption and data protection/correction, which are carried out during data transfers between the host, system memory, and/or storage media coupled to the storage controller (e.g., SoC memory and/or storage). With the pipelined processor architecture, the host controller may also implement adjustable built-in QoS (Quality of Service) algorithms which can be used to achieve different performance profiles targets. This disclosure describes various storage controller components (e.g., hardware, firmware, and/or software) including the host controller and pipelined processor with configurable processor elements, and describes functionalities enabled by a storage controller with a pipelined processor configured in accordance with one or more aspects.

The following discussion describes an operating environment, configurations, techniques that may be employed in the operating environment, and a System-on-Chip (SoC) in which components of the operating environment may be embodied. In the context of the present disclosure, reference is made to the operating environment, techniques, or various components by way of example only.

Operating Environment

FIG. 1 illustrates an example operating environment 100 having a host system 102, capable of storing or accessing various forms of data or information. Examples of a host system 102 may include a laptop computer 104, desktop computer 106, and server 108, any of which may be configured as user device, computing device, or as part of a storage network, data storage center, cloud storage, or the like. Further examples of host system 102 (not shown) may include a tablet computer, a set-top-box, a data storage appliance, wearable smart-device, television, content-streaming device, high-definition multimedia interface (HDMI) media stick, smart appliance, home automation controller, smart thermostat, Internet-of-Things (IoT) device, mobile-internet device (MID), a network-attached-storage (NAS) drive, aggregate storage system, gaming console, automotive entertainment device, automotive computing system, automotive control module (e.g., engine or power train control module), and so on. Generally, the host system 102 may communicate or store data for any suitable purpose, such as to enable functionalities of a particular type of device, provide a user interface, enable network access, implement gaming applications, playback media, provide navigation, edit content, provide data storage, or the like.

The host system 102 includes a processor 110 and computer-readable media 112. The processor 110 may be implemented as any suitable type or number of processors, either single-core or multi-core, for executing instructions or commands of an operating system or other applications of the host system 102. In aspects, the processors 110 of a host system may execute tenants, services, or workloads of a data storage system or data storage center. The computer-readable media 112 (CRM 112) includes memory (not shown) and a storage system 114 of the host system 102. The memory of the host system 102 may include any suitable type or combination of volatile memory or nonvolatile memory. For example, the volatile memory of host system 102 may include various types of random-access memory (RAM), dynamic RAM (DRAM), static RAM (SRAM) or the like. The non-volatile memory may include read-only memory (ROM), electronically erasable programmable ROM (EEPROM), solid-state storage media, or Flash memory.

The storage system 114 of the host system 102 may be configured as any suitable type of data storage system, such as a data storage center, storage device, storage drive, storage array, storage volume, or the like. Although described with reference to the host system 102, the storage system 114 may also be implemented separately as a stand-alone device or as part of a larger storage collective, such as a network-attached storage device, external storage drive, data storage center, server farm, or virtualized storage system (e.g., for cloud-based storage or services). Examples of the storage system 114 include a non-volatile memory express (NVMe) solid-state drive 116, a peripheral component interconnect express (PCIe) solid-state drive 118, a solid-state drive 120 (SSD 120), and a storage array 122, which may be implemented with any combination of storage devices or storage drives.

The storage system 114 includes storage media 124 and a storage media controller 126 (storage controller 126) for managing various operations or functionalities of the storage system 114. The storage media 124 may include or be formed from non-volatile memory devices on which data

128 or information of the host system 102 is stored. The storage media 124 may be implemented with any type or combination of solid-state memory media, such as Flash, NAND Flash, RAM, DRAM (e.g., for caching), SRAM, or the like. For example, the storage media 124 of the storage system 114 may include NAND Flash memory, single-level cell (SLC) Flash memory, multi-level cell (MLC) Flash memory, triple-level cell (TLC) Flash, quad-level cell Flash (QLC), NOR cell Flash, or any combination thereof. These memories, individually or in combination, may store data associated with a user, applications, tenant, workload, service, and/or an operating system of host system 102.

Generally, the storage controller 126 manages operation of the storage system 114 and enables the host system 102 to access the storage media 124 for data storage. The storage controller 126 may be implemented through any suitable combination of hardware, firmware, or software to provide various functionalities of the storage system 114. The storage controller 126 may also manage or administrate internal tasks or operations associated with the storage media 124, which may include data placement, data-to-block mapping, data caching, data migration, garbage collection, thermal management (e.g., throttling), power management, or the like. As such, the storage controller 126 may receive requests or commands (e.g., host I/Os) from the host system 102 for data access and queue (or generate) internal commands associated with internal operations for the storage media 124. Generally, the storage controller 126 may implement commands (e.g., media I/Os) for access of the storage media 124 that correspond to the host commands or requests for data access (e.g., host write requests or read requests) and/or commands for internal operations or tasks associated with data processing or accessing the storage media 124.

In this example, storage controller 126 also includes a host controller 130 (e.g., HCT), firmware 132 of the storage controller, and a pipelined processor 134 that includes multiple processor elements 136 with configurable grouping, staging, and/or functionalities. In other configurations, the storage controller 126 may have access to a pipelined processor 134 or components thereof. In various aspects, the host controller 130, firmware 132, or another component of the storage controller 126 may configure or use the pipelined processor 134 as described herein, which may enable various configurations of pipeline stages for processing data commands or data access throughout the storage controller.

Returning to FIG. 1, the host system 102 may also include I/O ports 138, a graphics processing unit 140 (GPU 140), and data interfaces 142. Generally, the I/O ports 138 allow a host system 102 to interact with other devices, peripherals, or users. For example, the I/O ports 138 may include or be coupled with a universal serial bus, human interface devices, audio inputs, audio outputs, or the like. The GPU 140 processes and renders graphics-related data for host system 102, such as user interface elements of an operating system, applications, or the like. In some cases, the GPU 140 accesses a portion of local memory to render graphics or includes dedicated memory for rendering graphics (e.g., video RAM) of the host system 102.

The data interfaces 142 of the host system 102 provide connectivity to one or more networks and other devices connected to those networks. The data interfaces 142 may include wired interfaces, such as Ethernet or fiber optic interfaces for communicating over a local network, intranet, or the Internet. Alternately or additionally, the data interfaces 142 may include wireless interfaces that facilitate communication over wireless networks, such as wireless LANs, wide-area wireless networks (e.g., cellular networks), and/or wireless personal-area-networks (WPANs). Any of the data communicated through the I/O ports 138 or the data interfaces 142 may be written to or read from the storage system 114 of the host system 102 in accordance with one or more aspects of a pipelined processor architecture with configurable grouping of processor elements.

FIG. 2 illustrates at 200 an example configuration of a solid-state storage system 202 (storage system 202) with components that may implement aspects of a pipelined processor architecture with configurable grouping of processor elements. The pipelined processor 134 may interact with the host system 102 and/or entities of the storage controller 126 to enable access to storage media, processing of various commands, data processing operations, or the like. In some implementations, the storage system is implemented as a solid-state storage device or solid-state storage drive, such as SSD 120 of FIG. 1. In aspects, the pipelined processor 134 can be configured or implemented with multiple stages or groups of processor elements 136, which may include general purpose (e.g., configurable) processor elements (GPEs) or task-specific processor elements (TSPEs), examples of which are described throughout this disclosure.

In this example, the storage controller 126 of the storage system 202 includes an instance of a host controller 130, firmware 132, the pipelined processor 134, and the processor elements 136, which may be selectively configured to provide a staged or pipelined processing system of multiple stages that each include one or more processor elements 136. In some implementations, additional storage controllers, or storage aggregators (not shown) of a storage system may be configured similar to the storage system 202 with respective instances of onboard pipelined processors 134, which may be configured similar to or different from one another. In aspects, the host controller 130 and/or firmware 132 of the storage controller 126 may communicate with the pipelined processor 134 and/or groups of processor elements 136 to exchange information, which may include various configuration parameters, reconfiguration parameters, performance targets (e.g., pipeline stage throughput, bandwidth, latency, or the like), data transfer commands, data processing commands, metrics for read/write content of workloads, or metrics of storage media access, examples of which are described herein.

As shown in FIG. 2, the pipelined processor 134 is illustrated in the context of a solid-state storage system 202 (e.g., solid-state storage drive (SSD) 120) and components of a storage controller 126. The storage system 202 may be coupled to any suitable host system 102 and implemented with storage media 124, which in this example includes multiple NAND Flash dies 204-1 through 204-$n$, where n is any suitable integer. In some cases, the NAND dies 204 form a NAND device that includes multiple channels (e.g., Flash channels) of memory devices, dies, or chips that may be accessible or managed on a channel-level (group of dies), device-level (individual dies), or block-level (individual blocks or pages of storage media cells). Although illustrated as components of the storage system 202, the pipelined processor 134 and/or processor elements 136 may be implemented separately from or external to a storage system 114. In some implementations, the pipelined processor 134 and other components of the storage controller 126 are implemented as part of a storage media accelerator or aggregate storage controller coupled between a host system 102 (e.g., via a network interface) and one or more storage media 124.

Generally, operations of the storage system 202 are enabled or managed by an instance of the storage controller 126, which in this example includes a host interface 206 to enable communication with the host system 102 and a media interface 208 to enable access to the storage media 124. The host interface 206 may be configured to implement any suitable type of storage interface or protocol, such as serial advanced technology attachment (SATA), universal serial bus (USB), PCIe, advanced host controller interface (AHCI), NVMe, NVM-over Fabric (NVM-OF), NVM host controller interface specification (NVMHCIS), small computer system interface (SCSI), serial attached SCSI (SAS), secure digital I/O (SDIO), Fibre channel, any combination thereof (e.g., an M.2 or next generation form-factor (NGFF) combined interface), or the like. Alternately or additionally, the media interface 208 may implement any suitable type of storage media interface, such as a Flash interface, Flash bus channel interface, NAND channel interface, physical page addressing (PPA) interface, or the like.

In various aspects, components of the storage system 202 or storage controller 126 provide a data path between the host interface 206 to the host system 102 and the media interface 208 to the storage media 124. In this example, the storage controller 126 includes a central processing unit 210 (CPU 210) of one or more processor cores (not shown) for executing a kernel, the firmware 132, flash translation layer, and/or a driver to implement various functions of the storage controller 126. In aspects, the firmware 132 or a processor manager (not shown) of the storage controller 126 configures and/or uses the pipelined processor 134 to perform various commands or data processing operations, which may allow the firmware 132 to offload various commands, tasks, or data operations to the pipelined processor 134. For example, the firmware 132 or processor manager can selectively group the processor elements 136 to form stages of the pipelined processor 134. In some cases, the firmware 132 configures the processor elements 136 of some of the stages to execute processor-executable instructions (e.g., micro-code) to implement respective functions of the pipelined processor 134. As described herein, the firmware 132 or processor manager may also form stages of the pipelined processor 134 with task-specific processor elements that are pre-configured to execute specific functions for performing various commands or data operations. Alternately or additionally, the pipelined processor 134 or other components of the storage controller 126 may execute from or run on function-specific hardware (e.g., hardware accelerators), machine learning (ML) modules, artificial intelligence (AI) engines, or task-specific processor cores.

As shown in FIG. 2, a fabric 212 of the storage controller 126 operably couples and enables communication between the components of the storage controller 126. The fabric 212 may include any suitable inter-component communication interface, such as control and/or data buses, a crossbar, an Advanced extensible Interface (AXI) bus, or the like. Generally, the processor elements 136 of the pipelined processor 134 may communicate with the host controller 130, firmware 132, host interface 206, media interface 208, CPU 210, or other components to exchange data, information, or command I/Os within the storage controller 126. In various aspects, the host controller 130 and/or firmware 132 may offload commands, tasks, or data processing to the pipelined processor 134, such as data processing, data encryption, and data protection/correction, and so forth that are available and can be carried out during the data transfer between the host system 102, system memory (e.g., SoC memory and/or storage), and/or storage media 124. A static random-access memory 214 (SRAM 214) or other non-volatile memory of the storage controller 126 may store processor-executable instructions or code for firmware, processor elements 136, or drivers of the storage controller, which may be executed by the CPU 210, processor elements 136, or other processors or controllers of the storage controller. The storage controller 126 may also include a dynamic random-access memory (DRAM) controller 216 and associated a DRAM 218 for storage or caching various data as the storage controller 126 moves and processes data between the host system 102, storage media 124, or other components of the storage controller.

Figure 3:
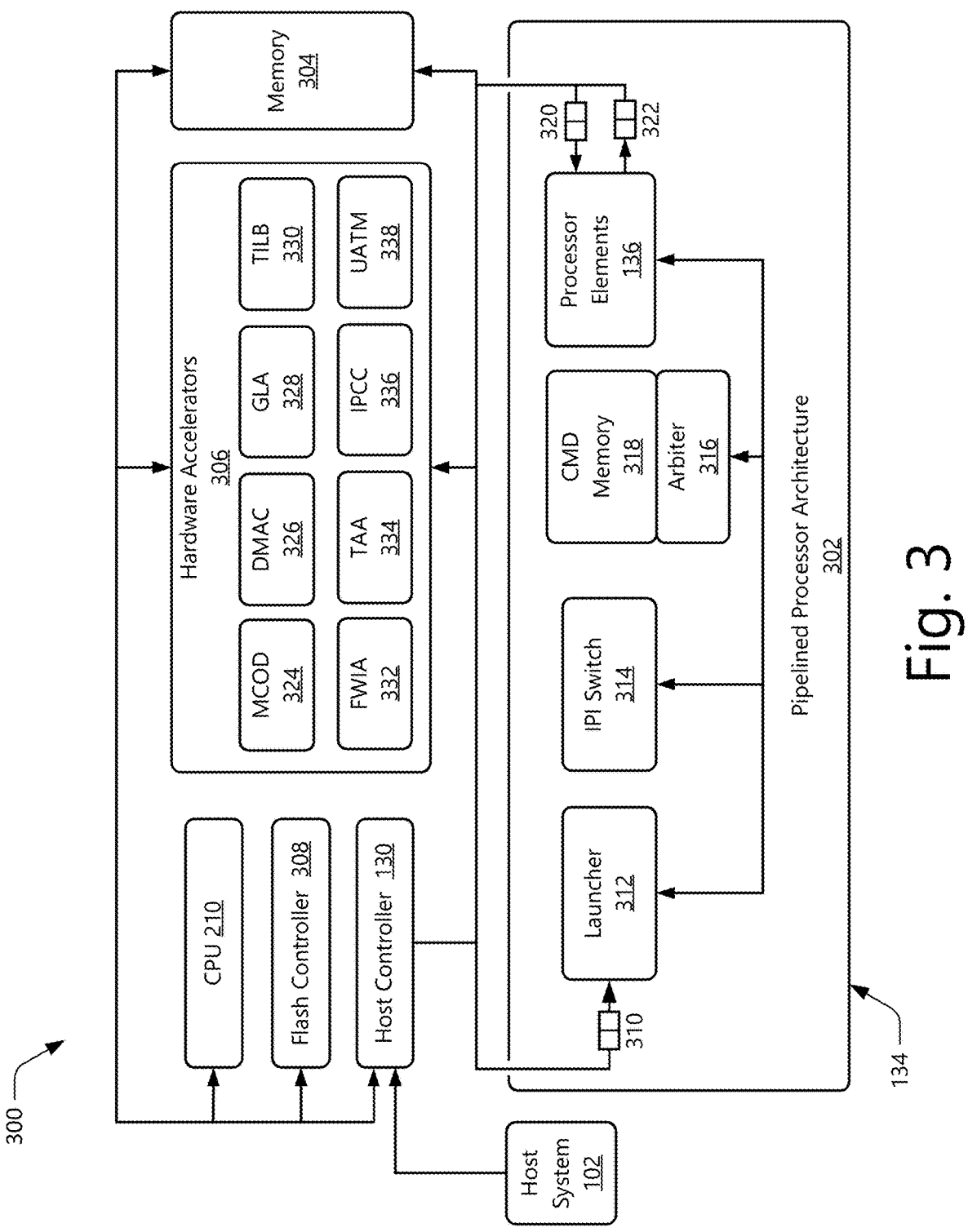
FIG. 3 illustrates an example configuration of a pipelined processor architecture with configurable grouping of processor elements.

FIG. 3 illustrates at 300 an example configuration of an example configuration of a pipelined processor architecture 302 with configurable grouping of processor elements. In aspects, the pipelined processor architecture 302 may represent the pipelined processor 134 of the storage controller 126 described herein. In some cases, the pipelined processor architecture 302, memory 304 (e.g., system memory), and hardware accelerators 306 are implemented as a command automation controller (CAC), which may participate in the processing of commands received from the host system 102. Based on configurations of firmware of a storage controller or respective components shown, the pipelined processor architecture 302 may be involved in processing commands and/or data in various ways, some examples of which are described with reference to FIG. 3 and throughout this disclosure.

As shown in FIG. 3, the pipelined processor architecture 302 may be operably coupled with a memory 304, hardware accelerators 306, a CPU 210, a Flash controller 308, and host controller 130, which may be implemented as components of a storage controller. The CPU 210 may execute firmware 132 (not shown) to implement functionalities of the storage controller, such as coordinating transactions between the host controller 130, Flash controller 308, and pipelined processor architecture 302 to move or process data as requested by commands (e.g., host commands) received from the host system 102. In some implementations, a system bus or local interfaces (e.g., an AXI interconnect or fabric) operably couple the host controller 130, CPU 210, hardware accelerators 306, Flash controller 308, and memory 304 to enable the exchange of commands, information, or the like. The pipelined processor architecture 302 may also include interfaces (e.g., processor element interfaces) for communicating any suitable commands, status indicators, data, or the like with the host controller 130, the memory 304, hardware accelerators 306.

In aspects, the pipelined processor architecture 302 includes a command submission first-in, first-out (FIFO) buffer 310 (CSF 310), which may receive commands from the host controller 130. In this example, the pipelined processor architecture 302 also includes a processor launcher 312 (launcher 312), an inter-processor interaction switch 314 (IPI switch 314), an arbiter 316, and a command memory 318 that are coupled to the processor elements 136. The CSF 310 buffer may receive commands from the host controller 130 for processing by components of the pipelined processor architecture 302 and the launcher 312 can store the commands to the command memory 318 or initiate action by other components of the architecture. Generally, the IPI switch 314 or an inter-processor communication controller manages routing of packets or data between various components of the pipeline processor architecture. The command memory 318 can store commands for processing and the arbiter 316 of the pipelined processor can arbitrate between commands to select a command for processing by the processor elements 136. In some implementations, the processor elements 136 are coupled to external accelerator and/or external memory input buffer 320 and output buffer 322, which enable communication with the memory 304 or hardware accelerators 306. The hardware accelerators 306 may include any suitable type of module or accelerator, and in this example include a media command overlap detector 324 (MCOD 324), a direct memory access controller 326 (DMAC 326), a general lookup accelerator 328 (GLA 328), transfer information linked builder 330 (TILB 330), a firmware interaction accelerator 332 (FWIA 332), a table access accelerator 334 (TAA 334), an inter-processor communication controller 336 (IPCC 336), and a universal address translation module 338 (UATM 338).

In aspects, the pipelined processor architecture 302 and components of the storage controller implement a general workflow for processing commands or data to provide functionalities of a media storage system. For example, the host controller 130 can fetch a command from the host system 102 based on detection of a doorbell event by the host controller 130. The host controller 130 or the firmware 132 may then assign the command a command index (e.g., a unique command index, not shown), which enables tracking of the command or associated data throughout the storage controller. The host controller 130 can then deliver the command and associated command index to the pipelined processor architecture 302 through the CSF 310 of the pipelined processor 134.

After receiving the command from the CSF 310, the launcher 312 may store the command to the command memory 318 in accordance with the command according to the command index of the command. In aspects, the launcher 312 initiates or triggers a group or stage of the processor elements 136 (e.g., one or more processor elements) to process the command of the host based on respective register configurations of processor elements 136. As described herein, the processor elements 136 (or processing units) of the pipelined processor 134 may process host commands according to microcode (e.g., processor-executable instructions) loaded into instruction memory of the processor element and/or command information loaded in a command memory of the processor element. In some cases, the processor element 136 processing the command uses one or more of the hardware accelerators 306 to accomplish its tasks for processing the command or associated data. Alternatively or additionally, the processor element 136 can access the memory 304, which may be configured as system memory for the storage controller. Generally, the processor element 136 can be configured to perform any suitable task for processing commands received from the host system 102, which may include command validation, command overlapping check, host logical block address (LBA) mapping/information lookup, and so forth. After completing the processing tasks for which the processor element is configured, the processor element can forward the command to the CPU 210 or firmware 132 through the IPCC 336 of the hardware accelerators 306.

In some aspects, the firmware 132 assumed control over processing the command after receiving command information (e.g., intermediate results of command processing) from the processor element 136 through the IPCC 336. The firmware 132, executing on the CPU 210, can program data transfer related configurations for the command in the host controller 130 HCT and then trigger the host controller 130 to transfer the data of the command from the host system 102 to the memory 304 (e.g., perform command activation). In some cases, the firmware 132 skips command activation when one of the processor elements 136 of the pipelined processor 134 performs these operations beforehand.

With respect to post-processing of the command after completion of the data transfer, the firmware 132 may manage post-processing tasks, such as cleaning up and freeing resources allocated for processing the host command. In other cases, the host controller 130 can send an indication or notification directly to one or more of the processor elements 136 to delegate post-processing activities after the data transfer completes. For example, the processor element(s) 136 can implement the post-processing activities according to the microcode loaded into the instruction memory of the processor element and/or command information stored in the command memory of the processor element. Alternatively or additionally, the processor element 136 can use one or more of the hardware accelerators 306 to perform these post-processing tasks, or access memory 304 to do so. After the processor element 136 completes the post-processing of the command, the post-processing task is considered complete and the processor element may notify the host controller 130 or firmware 132 of the completion via status registers.

Figure 4:
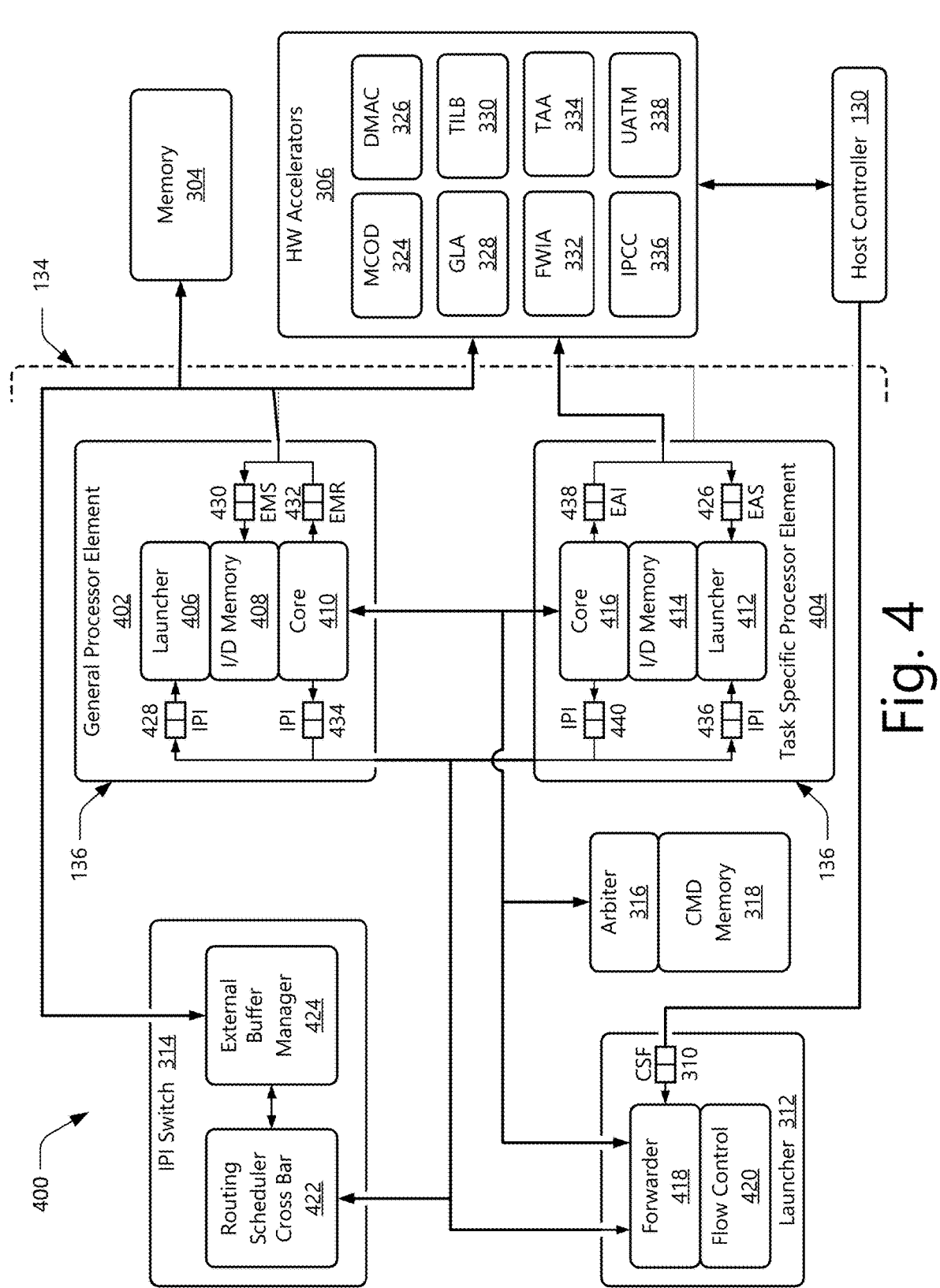
FIG. 4 illustrates an example configuration of processor elements of a pipelined processor in accordance with one or more aspects.

FIG. 4 illustrates at 400 an example configuration of processor elements of a pipelined processor in accordance with various aspects. As described herein, a pipelined processor 134 may include multiple processor elements 136 (or processing units) that are configured based on microcode or instructions loaded into memory of the processor elements. In aspects, the processor elements 136 of a pipelined processor 134 may be selectively grouped to form multiple processing stages, with each of the multiple stages configured to implement one or more processing functions or tasks depending on respective microcode loaded into the processor elements for execution. Thus, behavior and performance of the pipelined processor 134 is configurable by the firmware 132 or a processor management entity of a storage controller based on the groupings of the processor elements 136 and microcode loaded into the processor elements of each stage of the pipelined processor.

As shown in FIG. 4, a pipelined processor 134 can be implemented with multiple types of processor elements 136, which may include general processor elements 402 (GPEs 402) and task specific processor elements 404 (SPEs). For visual brevity, although one GPE 402 and one SPE 404 are shown, a pipelined processor 134 may be implemented with any suitable number (e.g., 20-50 processor elements) or combination of GPEs 402 and SPEs 404, which may be configured and used as described throughout this disclosure. In aspects, a GPE 402 may include a launcher 406 to receive commands, an instruction/data (I/D) memory 408 for storing instructions, commands, and data, and a processor core 410 for executing microcode and processing data. Alternatively or additionally, an SPE 404 may include a launcher 412 to receive commands, an instruction/data (I/D) memory 414 for storing instructions, commands, and data, and a processor core 416 for executing microcode and processing data. The GPE 402 and SPE 404 may be coupled to a host controller 130, memory 304, hardware accelerators 306, IPI switch 314, launcher 312, arbiter 316, and command memory 318, which may be implemented as described with reference to FIGS. 1-3 or throughout the disclosure. In this example, a launcher 312 includes a command forwarder 418, flow control block 420, and a CSF 310, and an IPI switch 314 includes a routing scheduler crossbar 422 and an external buffer manager 424, which is coupled to the memory 304, hardware accelerators 306, and the GPE 402.

In aspects, the CSF 310, FWIA 332, or IPCC 336 may be used to initiate activities of a pipelined processor 134, such as when processing host commands, processing data, transferring data, or the like. In some cases, the host controller 130 forwards a recently fetched host command (e.g., entire command information) to the pipelined processor 134 through the CSF 310 of the launcher 312. The host controller 130 can also assign a command index to the host command, which are transferred together to the CSF 310. In other cases, the host controller 130 forwards a host command that has been previously processed by the pipelined processor 134 back to the pipelined processor through the FWIA 332. The FWIA 332 can be configured to forward a message or notification to an SPE 404 that handles traffic originating or routed from the FWIA 332. The SPE 404 operably coupled to the FWIA 332 may receive the message or notification from the FWIA 332 as an external accelerator status 426 (EAS 426).

In some aspects, the firmware 132 forwards any host command that has been previously processed by the pipelined processor 134 back to the pipelined processor 134 for further action. For example, the firmware 132 can send an inter-processor interaction packet (IPI packet) to the pipelined processor 134 through the IPCC 336. The IPCC 366 can be configured to forward the IPI packet to an SPE 404 that handles traffic originating or routed from the IPCC 336. The SPE 404 operably coupled to the IPC 336 may receive the IPI packet from the IPCC 336 as another external accelerator status 426 (EAS 426).

Generally, the processor launcher 312 of the pipelined processor 134 can receive or obtain requests and/or commands from the CSF 310. In aspects, the launcher 312 constructs an IPI packet based on information loaded into registers of the launcher 312 by the firmware 132. The launcher 312 can initialize a command memory entry of the command memory 318 that corresponds to the command index provided with information of the command. The launcher 312 then sends the constructed IPI packet to the IPI switch 314, which in turn may deliver the IPI packet 428 to one of the GPEs 402 in accordance with routing information of the IPI packet.

When a GPE 402 receives an IPI packet, the GPE 402 can load an internal program counter (not shown) of the processor element (e.g., instruction pointer) and a command index register (not shown) according to information of the IPI packet. The GPE 402 may then initiate processing of the command by executing targeted instructions from the I/D memory of the GPE 402. Based on the command index of the IPI packet, the GPE 402 may also access command information associated with the IPI packet in the command memory 318 or access the system memory 304 via an AXI interface (e.g., external memory status 430 (EMS 430) or external memory read 432 (EMR 432)). When the GPE 402 determines to initiate processing via the hardware accelerators 306, the GPE 402 uses a specialized instruction to offload the processing task to an SPE 404 that is configured to access the hardware accelerators 306. By so doing, the GPE 402 passes processing of the command over to the SPE 404, thereby enabling the GPE 402 to immediately work on other commands without waiting for the hardware accelerators 306 to complete processing of the command. In some cases, the firmware 132 offloads or delegates command processing of the IPI packet 434 to another one of the GPEs 402 using the same specialized instruction.

In aspects, the GPE 402 or CPU 210 may execute this specialized instruction to construct an IPI packet that includes routing information of a selected one of the GPEs 402 or SPEs 404, as well as information related to the task to be offloaded or transferred (e.g., external activity). When the instruction generates or constructs an IPI packet for an SPE 404, the IPI packet may also include information (e.g., return information) for returning the task or results of the task back to a processor element from which the command or packet originated. Alternatively or additionally, the return information may specify a next GPE 402 to continue processing the command or IPI packet after the offloaded or transferred task is completed by the SPE 404 or hardware accelerator 306. After construction or generation of the IPI packet for offloading the task, the IPI packet is submitted to the IPI switch 314 and the IPI switch 314 routes the IPI packet to the destination GPE 402 or SPE 404 of the pipelined processor 134. These operations may be repeated when the destination for the IPI packet is a GPE 402, such to return the processed IPI packet to an originating processor element or to continue processing the command until returned to the firmware or host controller. Alternatively or additionally, the GPE 402 may also offload processing of a command, packet, or data directly to one of the hardware accelerators 306 via the AXI interface that couples the pipelined processor 134 to the hardware accelerators.

With respect to the SPEs 404 of the pipelined processor 134, an SPE 404 may include an arbiter (not shown) as part of the launcher 412 that can select IPI packets 436 or EASs 426 received by the SPE 404 for processing. For example, with the SPE 404 detects incoming an IPI Packet 436 or an EAS 426, the arbiter may automatically implement arbitration to select one of the IPI packet or EAS for processing. To indicate selection, the arbiter may set an internal flag to identify the selected packet or status for processing. In the context of processing an IPI packet, the SPE 404 can load a command index register according to the received IPI Packet and execute instructions from the I/D memory 414 that are associated with an IPI Packet handling sequence. Because the SPE 404 obtains the command index, the SPE 404 can access host command information in the command memory 318 of the pipelined processor 134. In some cases, the SPE 404 constructs an external accelerator interaction (EAI) packet 438 that is configured to activate and use one of the hardware accelerators 306 in accordance with the instructions and/or the information provided by the IPI packet. In such cases, another instruction can be configured to trigger the SPE 404 to send the EAI packet 438 to the hardware accelerator 306 to which the SPE 404 is operably coupled.

Based on the type of hardware accelerator 306 selected or coupled to the SPE 404, the SPE 404 may assign a unique request identifier (request ID) to the EAI packet when transmitted to the hardware accelerators. The SPE 404 may also store or save the current IPI packet within an internal request table according to the request ID. For example, these steps may be implemented for EAI packets when the packet is not routed to the FWIA 332 or IPCC 336, which may treat the packet as an IPI packet. For those hardware accelerators, the EAI packet can be forwarded to firmware from the IPCC 336 or the packet can be forwarded to the host controller 130 from the FWIA 332. Although the host command has exited the pipelined processor 134, the pipelined processor may still maintain the associated command information of the packet in the command memory 318.

Generally, the hardware accelerators 306 are configured to execute the EAI packet after the packet is received from the SPE 404 or another source. The hardware accelerators 306 may also be configured to, after completing execution of the packet, generate an external accelerator status 426 back to the SPE 404 from which the packet is received. This returned EAS 426 may include the request ID associated with the EAI packet 438 and stored by the request table of the SPE 404. As noted, the SPE 404 of the pipelined processor 134 can process an IPI packet 436 or an EAS 426. Assuming an EAS 426 is selected by the internal arbiter and the SPE 404 is operably coupled with the FWIA 332 or IPCC 336, the SPE 404 may treat the EAS in the same fashion as an IPI packet. In other cases, the SPE 404 accesses the request table to identify the request ID associated with the EAS to the corresponding IPI packet from internal memory.

When processing the EAS 426, the SPE 404 can load an internal command index register (not shown) according to the EAS or retrieved information. The SPE 404 then initiates execution of the instructions that are related to an EAS handling or processing sequence. Because the SPE 404 has the command index associated with the packet, the SPE 404 can access the host command information stored in the command memory 318 using the command index. In some cases, an instruction is configured to trigger the SPE 404 to construct a new IPI packet 440 based on the returning information of the current IPI Packet. Upon completion of constructing the IPI packet 440, the SPE 404 can send the IPI packet to the IPI switch 314 for routing to a selected GPE 402 or another component of the pipelined processor 134 as described herein. These are but a few ways in which the components of the pipelined processor 134 can interact to implement various storage controller operations, others of which are described herein.

Figure 5:
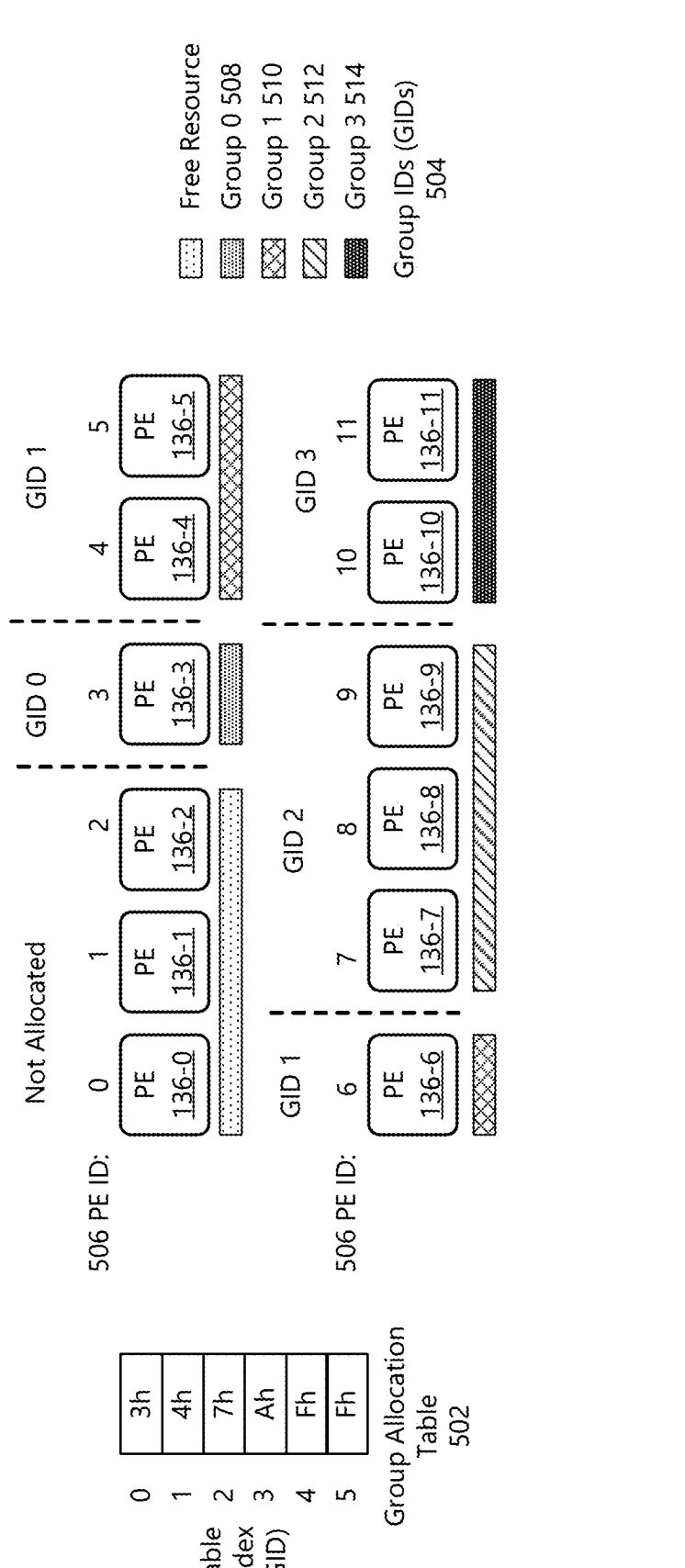
FIG. 5 illustrates an example group allocation table for managing processor element groups in accordance with one or more aspects.

FIG. 5 illustrates at 500 an example group allocation table for managing processor element groups in accordance with various aspects. As described herein, one or more processor elements 136 of a pipelined processor 134 may be configured into respective groups to form stages of the pipelined processor. In some cases, each processor element of a group is configured to implement one function to provide a single function stage of the pipelined processor 134. In other cases, each processor element of a group is configured to implement multiple functions to provide a multifunction stage (e.g., FIG. 6). In aspects, a pipelined processor 134 or storage accelerator may include a pool of a plurality of processor elements 136 from which the groups of processor elements are formed. Generally, the firmware 132 may form groups of processor elements and load respective microcode to the processor elements (e.g., GPEs 404) of each group to configure those groups or stages of the pipelined processor 134 to implement different functions, tasks, processing, or the like. Alternatively or additionally, some processor elements 136 may be preconfigured or statically configured to implement specific functions, such as SPEs 404 described with reference to FIG. 4.

In some aspects, each processor element 136 of a pipelined processor 134 may be indexed or identifiable by a unique processor element identifier or processor unit identifier. Due to the staged architecture of the pipelined processor 134, however, the firmware 132 and other components of a storage controller may not use this processor element ID to directly identify a processor element 136 and instead may use a group identifier associated with a group of processor elements 136 or pipeline stage of the pipelined processor 134. Thus, the pipelined processor architecture described herein may configure and use a processor element group concept to manage the processing resources configured for each pipeline stage of the processor (or a storage accelerator). To do so, the processor elements 136 may be grouped to form different groups or stages of processor elements in which each processor element of a particular group executes same microcode to implement the same function and/or handle the same pipeline stage(s) of command processing. In aspects, each group of processor elements can be assigned a unique group identifier (group ID), which enables identification and interaction with the associated group of processor elements (e.g., pipeline stage).

As described herein, the processor elements 136 may be configured as different types of processor elements, such as the general processor elements 402 and the task specific processor elements 404. In some implementations, the group IDs for the GPEs 402 can vary within a specific range based on the hardware configuration of the pipelined processor 134. In other cases, the group IDs for the SPEs 404 may be static or predefined and may be determined based on which hardware accelerator 306 or other component to which the SPE 404 is coupled. Further, some group IDs may be unassigned or reserved, and not assigned to any of the GPEs 402 or SPEs 404.

In aspects, the firmware 132 or a processor manager (not shown) of the pipelined processor 134 groups or allocates the processor elements 136 by using a group allocation table (GAT), such as when the storage controller is initialized. The processor elements 136 that are allocated or belong to the same group (e.g., pipeline stage) have an identical group ID. In some implementations, the firmware may use contiguous group IDs when grouping the processor elements 136, which may simplify design and use of the group allocation table. The pipelined processor 134 or storage controller 126 may include register space to which the group allocation table is directly mapped and accessible by the firmware 132. The group allocation table may be implemented as any suitable data structure, examples of which are described throughout this disclosure. The group allocation table may include multiple entries, with each entry having an index value starting from a predefined value (e.g., 0 or FF). Content of the group allocation table entry may start with the first or starting processor element ID of the processor element group. Thus, a difference between entries in the group allocation table may indicate a number of processor elements assigned or allocated to a group.

Each table entry has a corresponding index (starting from 0). The table entry index is basically the Group ID of the FPU Group. The content of the table entry is the starting FPU ID of the FPU Group. In general, the difference between 2 table entries defines the number of GFPUs that have been allocated to a FPU Group. When programming the group allocation table, the firmware 132 may do so in accordance with various rules configured to prevent configuration errors or undefined configurations. For example, the table entries should be configured with proper values and when a processor element group or group ID is disabled, a corresponding table entry should reflect the stage of the processor group (e.g., all Is or F). Additionally, the value assigned to a table entry must be less than the maximum number of allowed or supported processor elements and for every two adjacent table entries, a value of the table entry with higher table entry index must be larger than the value of the table entry with lower table entry index. Thus, the table entry index value of all Is can be reserved for indicating that the processor element group or group ID is disabled in the group allocation table.

As an example, consider a group allocation table (GAT) 502 of FIG. 5, which illustrates an assignment of group IDs 504 to different groups of 12 processor elements 136-0 through 136-11, which are selectable or identifiable via processor element IDs 506 0-11. Although shown with six table entries, the group allocation table 502 may include any suitable number of entries for grouping the processor elements 136. With six table entries, the firmware 132 can create or form six processor element groups, which include group 0 508, group 1 510, group 2 512, and group 3 514 as indicated by the group listing. Note that the group allocation table may start at any value, and in this example starts at 3 h for unallocated processor elements 136-0 through 136-2 (e.g., free resources). As described, the firmware 132 may set the group allocation table 502 entries to specify respective sizes of each of the processor element groups. In this example, the firmware 132 creates group 0 508 with one processor element 136-3, processor element ID 3, by setting entry 1 of the group allocation table to 4 h (e.g., 4 h–3 h=1). Similarly, the firmware 132 creates group 1 510 with three processor elements 136-4 through 136-6, processor element IDs 4-6, by setting entry 2 of the group allocation table to 7 h and group 2 512 with three processor elements 136-7 through 136-9, processor element IDs 7-9, by setting entry 3 of the group allocation table to Ah. As the last group of processor elements, the firmware 132 creates group 3 514 with two remaining processor elements 136-10 and 136-11, processor element IDs 10 and 11, and sets the unused entries 4 and 5 of the group allocation table to Fh. Thus, in some cases, any remaining processor elements 136 may be grouped into a last processor element group (e.g., group 3 514) by default when a last entry in the group allocation table 502 is set to all Is or another predefined value.

Figure 6:
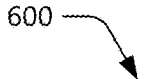
FIG. 6 illustrates example configurations of stages of a pipelined processor in accordance with one or more aspects.

FIG. 6 illustrates at 600 example configurations of stages of a pipelined processor in accordance with various aspects. In the context of the processor element grouping described with reference to FIG. 5, FIG. 6 shows an example of pipeline stage formation and grouping of processor elements 136 based on an operational value for the pipelined processor. For example, the various stages 602 of the pipelined processor 134 may be formed with different numbers of processor elements 136 to achieve a desired or target operational parameter for command processing, such as latency, throughput, delay, or bandwidth. By way of review, execution of host commands typically involves many firmware and hardware interactions. Due to increasing performance requirements and limited numbers of processors, firmware is often a bottleneck and requires additional assistance from hardware. As flexibility is a concern with static hardware-based solutions due to increased area and power consumption, the aspects of a pipelined processor with configurable grouping of processor elements enable increased performance while maintaining the flexibility by providing a pipelined processor concept with configurable stages that operate based on different microcode.

Generally, the firmware code (e.g., firmware 132) that executes on the main CPU of an system-on-chip (e.g., CPU 210) may implement a long sequence of various operations to complete processing of a host command. As described herein, aspects of a pipelined processor with configurable grouping of processor elements provides a pipeline architecture across which operations for command processing can be broken or separated into multiple stages. This pipelined architecture may not only utilize all available processor elements but may also reduce instruction and/or data memory size of all the processor elements. To do so, a full features set of firmware microcode may be divided and translated into separate sections of microcode configured to implement different command processing or packet handling operations. Thus, in some implementations, the microcode for the processor elements 136 of the pipelined processor 134 includes a sequence of microcode that is constructed using custom designed instructions, which is divided into separate microcode blocks or sections. Each pipeline stage may include one or more processor elements to execute a respective block or section of the microcode to implement processing operations of that stage of the pipeline (e.g., microcode that contains a firmware sequence dedicated to that pipeline stage).

In aspects, when the firmware 132 determines or assigns processor element 136 resources to each pipeline stage, the firmware may evaluate a workload of that pipeline stage. For example, the firmware may determine or estimate a duration of time consumed by the pipeline stage and assign the processor element resources based on the duration of time (or another operational value) and a desired or target performance metric or value. Thus, the firmware 132 may estimate an operational value for a pipeline stage to perform a command processing function, and then assign processing resources based on a target, required, specified, or desired operational level of the pipelined processor. Examples of such operational values and corresponding operational levels may include latency, processing time, delay, bandwidth, throughput, power consumption, or any combination thereof. Generally, the firmware 132 allocates or assigns more processor elements 136 to pipeline stages that have a greater workload and/or consume more processing time, such that stages of the pipeline have similar throughput. As described with reference to FIG. 5, after the firmware 132 allocates a processor element 136 to a selected processor element group, the processor element is associated with a group ID. In aspects, the firmware assigns the same group ID to all processor elements 136 under a same processor element group and may load same microcode to those processor elements. Thus, the processor element grouping concept enables hardware and firmware to easily identify pipeline stages and communication between the processor elements can be simplified. In other words, there is no restriction on a number of pipeline stages that firmware 132 can assign to a particular processor element group to manage or handle.

Returning to FIG. 6, assume that the firmware has divided a command processing sequence into six pipeline stages, stage 602-0 through 602-5. In aspects, the firmware 132 assigns each of the stage 602-0 through 602-5 a specific number of processor elements 136 based on a workload, estimated performance, and a performance target (e.g., processing time, latency, bandwidth). In this example, a performance target level for the pipelined processor 134, and thus each pipeline stage 602, is set for 600 nanosecond (600 ns). In other words, the firmware 132 determines how many processor elements 136 to assign to the pipeline stages 602-0 through 602-5 such that each pipeline stage 602 completes processing of one command (or packet) every 600 ns. In the present example, one processor element 136 can complete the CMD launch 604 and CMD check 0 606 tasks of pipeline stage 0 602-0 in 584 ns. Because the throughput of the one processor element 136 is higher than the performance target of 600 ns, one processor element is sufficient and the firmware 132 assigns one processor element to group A 608. For stage 1 602-1, one processor element 136 consumes 1789 ns to complete processing tasks 610-616 and the firmware assigns three processor elements 136 to group B 618. Stage 2 602-2 includes one overlap check task 620 that takes a processor element 136 3.6 milliseconds (ms) to complete, for which the firmware assigns six processor elements to group C 622. Continuing the example, based on a processor element 136 takes 4.8 ms to complete the two tasks 630 and 632 of stage 4 602-4, the firmware assigns eight processor elements to group E 634. For stage 5 602-5, one processor element 136 consumes 1207 ns to complete processing tasks 636 and 638, thus the firmware assigns two processor elements 136 to group F 640. As shown by the example pipeline stages, the firmware 132 may determine a number of processor elements to assign based ratio between an operational parameter value of a stage (e.g., total consumed time by one processor element) and a performance target for the stage (e.g., total time for performing one or more tasks of the pipeline stage).

In addition to the general processor elements 402, the pipelined processor 134 also includes task specific processor elements 404 and hardware accelerators 306 to which command processing tasks can be offloaded. For example, a pipelined processor 134 of multiple stages 602 of processor elements 136 may stall or hang before being able to complete high-latency processing operations. Generally, the hardware accelerators 306 are better suited for handling these-high latency processing operations, thereby freeing the pipelined processor 134 continue processing commands and packets offloaded from the firmware 132 and main CPU 210 of the storage controller. In some implementations, however, the hardware accelerators use different command and status data structures, which may not be supported by the microcode of the GPEs 402. Thus, to maintain flexibility and hardware reuse, some of the processor elements 136 of the pipelined processor 134 can be configured as task specific processor elements 404, or SPEs 404, to handle construction of commands for the hardware accelerators 306 and translate status indicators received from the hardware accelerators. In aspects, in comparison to the instruction memory of the GPEs 402 that implements a wide variety of tasks, the SPEs 404 may be implemented with a compact instruction memory for microcode to implement its specific task. Generally, the firmware 132 may consider an operation initiated by a SPE 404 as one pipeline stage of the command processing because processing time, including time consumed by the hardware accelerator activities, typically exceeds the performance targets of the pipelined processor. For this reason, the firmware 132 may assign unique and/or fixed group IDs to the SPEs 404 of the pipeline processor. For example, the firmware 132 may assign respective groups IDs to the SPEs 404 that are operably coupled with specific hardware accelerators as shown in Table 1 below.

TABLE 1

| Group IDs for General and Task Specific Processor Elements | |
|---|---|
| Group ID | Description |
| 0~N-1 | Group IDs for General Processor Elements (GPEs) according to a Group Allocation Table |
| 12 | Group ID for the Task Specific Processing Element (SPE) that communicates with UATM 706 |
| 13 | Group ID for the SPE that communicates with the GLA |
| 14 | Group ID for the SPE that communicates with the TAA-MAL |
| 15 | Group ID for the SPE that communicates with the TAA-CUL |
| 16 | Group ID for the SPE that communicates with the MCOD |
| 17 | Group ID for the SPE that communicates with the DMAC |
| 18 | Group ID for the SPE that communicates with the FWIA |
| 19 | Group ID for the SPE that communicates with the IPCC |
| 10 | Group ID for the SPE that communicates with the FPAL |
| 11 | Group ID for the SPE that communicates with the IPI Switch |

Figure 7:
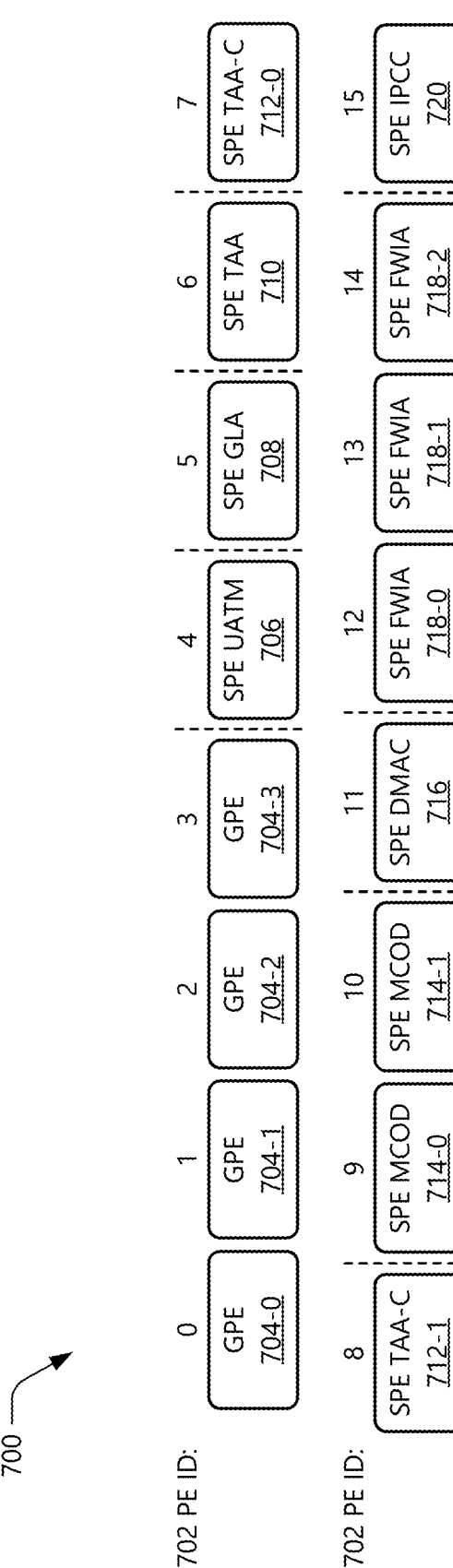
FIG. 7 illustrates an example configuration of processor element identifiers for specific purpose processor elements and general processor elements.

FIG. 7 illustrates at 700 an example configuration of processor element identifiers for specific purpose processor elements and general processor elements. In aspects, the firmware may prepare and load respective microcode to the processor elements when configuring and/or initializing stages of a pipelined processor with configurable grouping of the processor elements. As described herein, the firmware 132 may organize the processor elements 136 into groups with a group ID, such as to form the stages of the pipelined processor. Generally, the firmware 132 may also configure or load the processor elements 136 under a group ID with the same microcode. In some implementations, the firmware accesses the instruction memory of the processor elements 136 through an advanced high-performance bus (AHB) slave port (e.g., directly mapped) or indirectly mapped registers. Although the slave ports of the processor elements may support mapping or loading of microcode by group ID, the firmware 132 may selectively configure individual processor elements using a unique processor element identifier 702 (PE ID 702). In aspects, the pipelined processor 134 can assign a unique PE ID 702 to each processor element 136 of the processor 134 (e.g., processors grouped into pipeline stages).

In aspects, the pipelined processor 134 or firmware may assign the PE ID 702 incrementally (e.g., starting at zero) across different types of processor elements 136. In some cases, the pipelined processor 134 assigns PE IDs 702 for processor elements 136 of a same type or configuration before assigning PE IDs 702 to a next type of the processor elements. As an example, consider Table 2 below that includes an ID assignment sequence across different types of processor elements, starting from a first entry of the table (general processor elements) to the last entry of the table (task specific processor elements for the IPCC). The entries of the table are configured to indicate a number of processor element resources assigned for each type of processor element.

TABLE 2

| Processor Element ID Assignment Sequence | |
|---|---|
| Processor Element Type | Number of Processor Elements |
| GPE | PP_PARM_NGPE |
| UATM SFPE | PP_PARM_NSFPE_UATM |
| GLA SFPE | PP_PARM_NSFPE_GLA |
| TAA-MAL SFPE | PP_PARM_NSFPE_TAAM |
| TAA-CUL SFPE | PP_PARM_NSFPE_TAAC |
| MCOD SFPE | PP_PARM_NSFPE_MCOD |
| DMAC SFPE | PP_PARM_NSFPE_DMAC |
| FWIA SFPE | PP_PARM_NSFPE_FWIA |
| IPCC SFPE | PP_PARM_NSFPE_IPCC |

Returning to FIG. 7, the example configuration of PE IDs 702 includes respective PE IDs 702 assigned to various types of processor elements, which may be assigned based on parameters shown in Table 2 (e.g. incrementally by order of type). Specifically, in this example, four general processor elements 704-0 through 704-3 are assigned PE IDs 0 through 3, one SPE UATM 706 is assigned a PE ID of 4, one SPE GLA 708 is assigned a PE ID of 5, one SPE TAA 710 is assigned a PE ID of 6, two SPE TAA-Cs 712-0 and 712-1 are assigned PE IDs of 7 and 8, two SPE MCODs 714-0 and 714-1 are assigned PE IDs of 9 and 10, one SPE DMAC 716 is assigned a PE ID of 11, three SPE FWIAs 718-0 through 718-2 are assigned PE IDs of 12 through 14, and one SPE IPCC 720 is assigned a PE ID of 15. In aspects, the firmware 132 determines, based on estimated performance and/or target performance requirements, a number of processor elements 136 to enable or disable during initialization of the pipelined processor 134. In some cases, the firmware may enable a processor element on the fly (e.g., after initialization) to increase performance of the pipelined processor 134. When the firmware enables a previously disabled processor element, hardware may automatically apply a soft reset to the FPU. Once the reset of the processor element 136 is complete, the launcher can start to operate and the processor element may begin to execute microcode to implement its assigned function.

FIG. 8 illustrates at 800 an example of an inter-processor interaction packet 802 (IPI packet 802) configured in accordance with one or more aspects. In various aspects, the host controller 130 may issue command submission FIFO (CSF) requests through a launcher 312 of the pipelined processor 134 as part of a command registration process to enable the pipelined processor to process commands. In other words, before the pipelined processor 134 processes a command, the host command may be registered to the pipelined processor by the launcher 312. As shown in FIG. 8, the launcher 312 may construct an IPI packet 802 through the use of pointers and data of a CSF request 804 as described herein. Generally, the host controller 130 may initiate operations of the launcher 312 through the CSF 310 associated with the launcher. In some cases, when the firmware offloads commands to the pipelined processor, the firmware may configure the host controller 130 to issue a corresponding CSF request for a fetched host command to the launcher through CSF with to a predefined data structure.

In aspects, the CSF request includes a command index (e.g., assigned by the host controller) and the original command information sent by the host system. When received by the launcher 312, the launcher can register the host command by copying the command information from the CSF Request to a command memory entry based on the command index of the request. The command memory (e.g., CMD memory 318) may be configured as a centralized storage space that is managed by the command index and accessible by the processor elements 136 of the pipelined processor 134. Upon completion of registration, the launcher may inform or alert one of the processor elements 136 to process the associated host command by issuing an IPI packet.

The IPI switch of the pipelined processor 134 can route the IPI packet to a destination processor element 136 on a header 806 of the IPI packet. Alternatively or additionally, the processor element 136 may also need the information in the IPI packet header 806 to initiate processing of the packet. In aspects, the firmware 132 provides header information (e.g., routing group ID and execution instruction pointer) to the launcher through corresponding registers to enable construction of the IPI header 806 by the launcher. In some cases, the firmware can specify or provide multiple sets of header information that are each assigned a unique identifier. When processing a CSF request, the launcher can select one set of the header information to construct the IPI packet header 806 based on a type of the CSF request. Example types of CSF request opcodes include undefined type (00b), write type (01b), read type (10b), and another undefined type (11b).

During construction of the IPI packet the launcher may also program a Group ID of the launcher to an execution Group ID field of the IPI packet header 806. A CSF request may also have a corresponding header information select or identifier that maintains the ID of the header information useful for constructing the IPI packet header. In some implementations, the firmware 132 configures the header information select through dedicated configuration registers. For example, header information 0 may include processor element 0 routing information and header information 1 may include processor element 1 routing information. The header information selects may be represented as 0 h, 0 h, and 1 h for write type, read type, and undefined type, respectively. By way of example, when the launcher receives a write type or read type CSF Request, the launcher issues an IPI packet to processor element 0 and alternatively issues an IPI packet to processor element 1 when an undefined type CSF Request is received. Note, the execution instruction pointer field of the header information is not necessary for task specific processor elements, and therefore the firmware may take advantage of this by embedding additional information for the processor element in the execution instruction pointer field.

When executing a host command, a processor element 136 may obtain command information from the command memory of the pipelined processor 134. Although the processor element can access the command memory, the command memory may not be local and the processor element may encounter increased latency. Because the IPI packet is stored in local memory of the processor element and the launcher has the entire command information from the CSF Request, the launcher can assist the processor element by importing command information from CSF Request to a payload 808 of the IPI packet directly. Thus, the processor element may reduce a number of command memory accesses by leveraging information of the IPI packet. In some implementations, the IPI packet is not large enough to maintain the entire command information, and the launcher may provide data pointers for the firmware to specify portions of command information that are imported into the IPI Packet from the CSF Request.

In some aspects, the launcher provides three pointers to specify portions of command information for constructing the IPI packet. Generally, the pointers may specify a starting Dword offset of a data region composed on consecutive or adjacent Dwords within the CSF request. In some cases, a first pointer points to a data region that contains 1 Dword, a second pointer points to a data region that contains 4 Dwords, and a third pointer points to a data region that contains 6 Dwords. Based on the pointers, the launcher can fill up the IPI packet payload by copying the data from the data regions starting from the first pointer.

Returning to FIG. 8, the launcher 312 provides three pointers into the data of the CSF request 804 that include pointer 1 810 to Dword 0, pointer 2 812 to Dword 5, and pointer 3 814 to Dword 14. Based on the pointers 810 through 814, the launcher 312 copies data 816 of Dword 5 from the CSF request 804 to Dword 1 of the IPI packet 802, which is a starting word of the payload 808 of the IPI packet. The launcher 312 then copies data 818 of Dwords 0-3 from the CSF request 804 to Dwords 2-5 of the IPI packet 802. To complete the IPI packet payload 808 the launcher 312 copies data 820 of Dwords 14-19 from the CSF request 804 to Dwords 6-11 of the IPI packet 802. Although described in sequential order, the launcher 312 may import data from the CSF request 804 into the payload of the IPI packet 802 in any suitable order.

FIG. 9 illustrates at 900 an example of an inter-processor interaction switch configuration and an example inter-processor interaction packet configuration at 901. In various aspects, a pipelined processor architecture of a storage controller includes an inter-processor interaction switch 314 (IPI switch 314) to route commands, packets, or information between processor elements 136 or other components of the architecture (e.g., FIG. 3 and FIG. 4). Information or data structures exchanged through the IPI switch 314 may be referred to as an IPI packet 902, examples of which are described herein. As shown in FIG. 9, the IPI switch 314 can be implemented with a star topology in which endpoints (e.g., processor elements, memory, hardware accelerators) of the IPI packet network are physically connected to the IPI switch as the central device (e.g., switching device or node) of the network. In aspects, the star topology may enable simplified hardware design, as well as improved packet inspection and tracing capabilities, which may enable the firmware to trace and address various performance issues. In this example, the IPI switch 314 is directly coupled with multiple processor elements 136-1 through 136-*n*, where n is any suitable integer and the processor elements 136 may include any combination of general processor elements and/or task specific processor elements. Alternatively or additionally, the IPI switch 314 may be coupled to or communicate with other components of the pipelined processor architecture including hardware accelerators, system memory, a launcher, or the like.

In aspects, the IPI packets 902 routed by the IPI switch 314 may be configured to initiate transitions between pipeline stages, as well as pass information to a processor element of a next pipeline stage. The originators of IPI packets 902 or the IPI switch 314 may generate or modify IPI packets 902 of any suitable structure or size, which may include multiple Dwords or fields to store header information, status indicators, payload data, or the like. In this example, the IPI packet 902 includes a 1-Dword header at Dword 0 and 11-Dword payload of Dwords 1-11. This header may include routing information 904 and execution information 906, while the payload may include any suitable information to be delivered to a processor element or other component. In some cases, the firmware or a processor element selectively configures the header with a routing group ID 908, execution group ID 910, an execution instruction pointer 912, and/or a command index 914. Although the firmware 132 may access the command memory, which is a shared memory space among all processor elements, the described IPI packets enable quicker access because the IPI packets are stored to local memory of the processor element. Generally, access latency of the local memory of the processor element is much lower than when the processor element fetches information from the external command memory of the pipelined processor. In some aspects, the IPI switch 314 may be configured to monitor packet traffic (or processor element buffers and/or queues) and detect when congestion occurs during the routing of packets between the processor elements. When the IPI switch 314 detects congestion, the IPI switch can offload packets to external or system memory, which may allow the congestion to decrease. When the IPI switch 314 detects that the congestion is resolved, the IPI switch can then load the packets back to the IPI switch for routing and/or processing. In some cases, the IPI switch increases respective priority levels associated with the reloaded packets, which may prioritize the processing of those packets.

In aspects, the IPI switch 314 couples the processor elements 136 to each other, which enables one processor element of the pipelined processor to communicate IPI packets 902 or other information with any other processor element of the pipelined processor 134. In other words, the IPI switch can provide a fabric-like connection between all of the processor elements that transfers data packets based on routing information instead of preconfigured or linear register-based access. Thus, unlike alternative or hardwired pipeline architectures that feed data in a linear fashion through registers that couple each stage to the next, the IPI switch 314 enables a processor element of one stage of the pipelined processor to communicate IPI packets with a processor element of any other stage or another entity coupled to the IPI switch, which may include system memory, the launcher, and so forth. Further, with group addressing of processor elements for each stage or function of the pipelined processor, the firmware 132 of the pipelined processor 134 can flexibly or adaptively group (or organize) a plurality of processor elements 136 to form different stages of the pipelined processor 134 because the IPI switch can route data between processor elements by group identifier (e.g., per stage) and operate agnostic to individual processor identifiers. In other words, the use of the IPI switch and group addressing of processing elements allows the firmware to selectively group the processing elements into multiple stages and configure each stage to implement a different function and/or implement different data processing flows between stages because the processing elements described herein are not limited to a sequential ordering or register-based data progression typically associated with standard pipeline architectures.

With respect to group identifiers, the IPI switch 314 may implement a group addressing scheme using the group routing ID for routing IPI packets to different groups or stages of processor elements. Thus, the IPI switch enables a processor element of one stage to communicate an IPI packet with another processor element of a different stage based on a group identifier for all the processor elements of the different stage. Because multiple processor elements of a group ID execute the same microcode to implement the same function(s), the IPI packet will execute correctly as long the IPI switch delivers the packet to the appropriate set of processor elements using the group ID. To forward command processing to a next pipeline stage, a processor element 136 can construct an IPI packet in data memory and use an internal packet send instruction to forward the IPI Packet to a next processor element. In some cases, the internal packet send instruction modifies a header of the IPI packet prior to delivery to the IPI switch based on the type of processor element to which the IPI packet is addressed. Thus, various transactions or data transfers between processor elements are carried out by transferring IPI packets through the IPI switch based on routing information generated by a processor element instead of simply forwarding processed data linearly through registers to a next stage as done in standard pipelines architectures.

Generally, the internal packet send instruction enables IPI packet communication between general processor elements 402 and/or task specific processor elements 404. Unlike preceding processor pipeline in which each pipeline stage communicates with a next stage directly through registers, the IPI switch may be coupled to the processor elements of multiple processor groups or processor stages (e.g., all processor elements of a pipelined processor 134) and enable a processor element (GPE 402 or SPE 404) to communicate an IPI packet with any other processor group or processor stage of the pipelined processor 134. Usage of the internal packet send instruction for general processor elements may be treated as a main function and usage of the internal packet send instruction for task specific processor elements can be treated as a function or routine call within the main function. In other words, issuing an IPI packet to a task specific processor element is similar to making a function call. The routing information 904 of the IPI packet header can be used to specify the selected task specific processor element group, like a starting address of the function call. Specifically, this information may include or use the routing group ID 908 (RGID 908) to indicate the selected or targeted task specific processor element group.

The execution information 906 can be used to specify returning information for the general processor element, similar to creating stack information before a function call. The header of the IPI packet may also include the command index 914 (CMDidx 914) of the host command that the task specific processor element group should process or operate on. The returning information of the IPI packet may include the execution group ID 910 (EGID 910) and the execution instruction pointer 912 (InstPtr 912). The IPI packet payload may specify or include information that can assist the processor element with the execution of the IPI Packet, like arguments of a function call. When a task specific processor element receives the IPI Packet, the processor element can load the packet into the I/O Region internal data memory and use the command index 914 to initialize the core of the processor element for processing the command or contents of the IPI packet.

Figure 10:
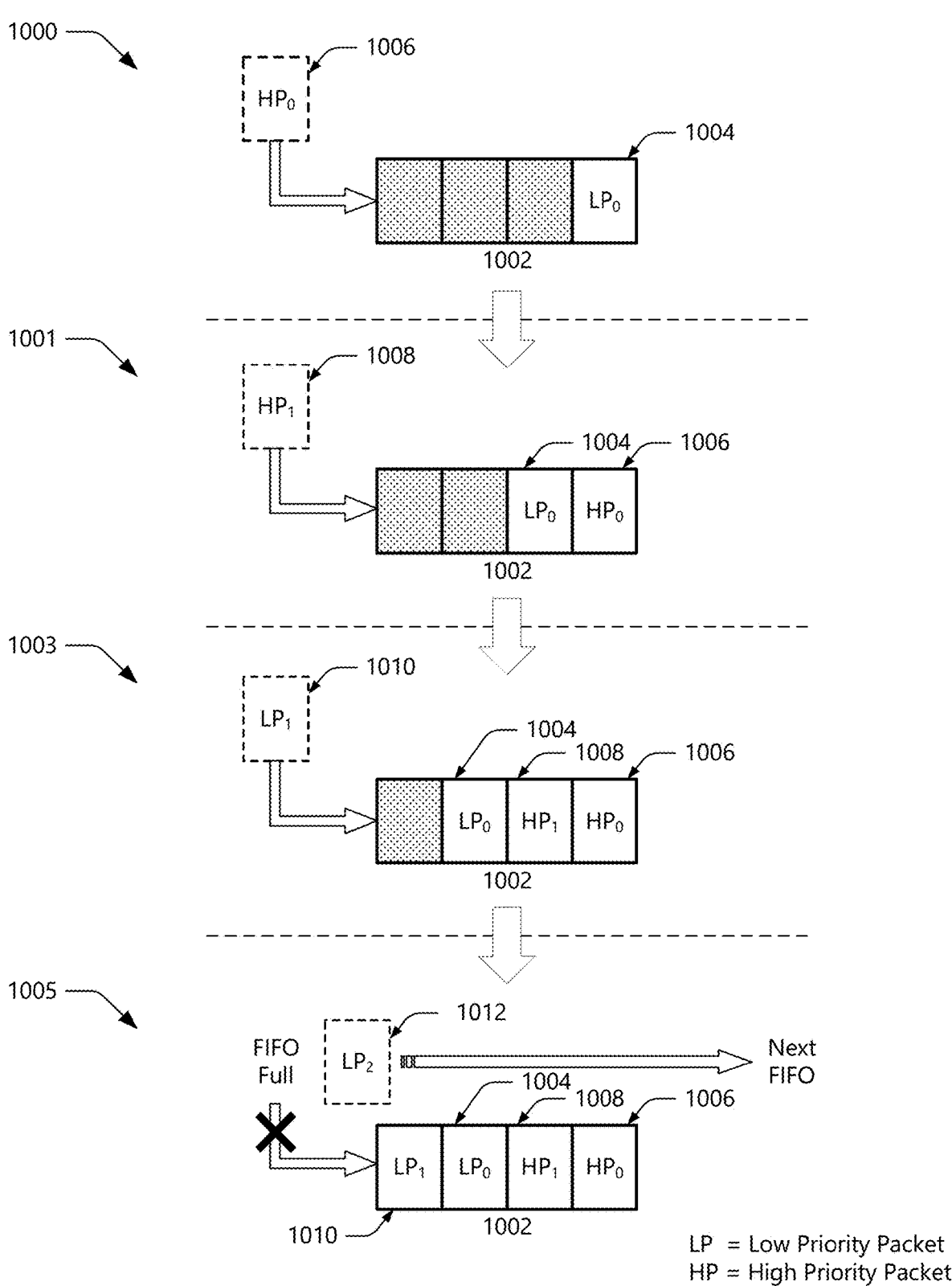
FIG. 10 illustrates an example first-in, first-out buffer capable of re-ordering packets in accordance with one or more aspects.

FIG. 10 illustrates at 1000 an example first-in, first-out buffer capable of re-ordering packets in accordance with one or more aspects. In various aspects, components of a pipelined processor 134 may implement a first-in, first-out (FIFO) buffer 1002 with configurable reservation areas and/or re-ordering of buffer contents. These FIFO buffers of the pipelined processor may operate in combination or based on priorities assigned to packets by originators of the packets or by the IPI switch. By prioritizing IPI packets, the firmware can ensure that the general processor elements focus on processing host commands at hand rather than be interrupted by newly arrived host commands or other communications. In some implementations, the IPI packets associated with task specific processor element responses are prioritized higher than other IPI packets enabling the general processor elements to quickly handle those responses (e.g., hardware accelerator responses) and return to the ongoing processing of a host command. As described herein, the general processor elements of the pipelined processor can receive IPI packets via an input FIFO buffer of the processor element. To ensure that the general processor element can handle higher priority IPI packets, the input FIFO buffer can be configured with slot reservation and implement slot re-ordering for IPI packets.

In aspects, the input FIFO buffer of the general processor element includes or is configured with multiple slots for storing IPI packets received by the processor element. In some cases, the firmware 132 specifies or allocates a number of slots that are reserved for urgent or high priority packets. Other slot types, such as shared slots, may be allocated by default from a number of slots remaining after the allocation of the urgent or high priority slots. To so do, the firmware may set values in a group configuration table entry for the processor element group to which the processor element belongs. Thus, multiple general processor elements under or assigned to a group ID may have the same FIFO buffer reservation configuration, where a minimum number of reserved packet slots is zero. Generally, a maximum number of reserved slots is less than a total number of slots available in the FIFO buffer, which can reduce the probability of deadlocks or IPI packet congestion. In aspects, IPI packets of any priority can be stored to non-reserved packet slots of the FIFO buffer and the FIFO buffer may store urgent priority packets to the reserved packet slots before using the non-reserved packet slots.

The FIFO buffer may also implement slot re-ordering when new IPI packets are received. For example, the general processor element receives an IPI packet, the processor element can check the priority of the packet against other packets that currently reside in the FIFO buffer. Based on the respective priorities of the new and current IPI packets, the general processor element inserts the newly received IPI packet into a proper location within the FIFO buffer. Generally, higher priority packets are inserted closer to a head or last slot of the FIFO buffer, which may enable the general processor element to process the higher priority packets first. In various aspects, the general processor element maintains the receiving order of the IPI packets having a same priority, such that those packets may be processed in order of reception.

By way of example, consider the FIFO buffer 1002 at 1000 where the FIFO buffer 1002 stores a first low priority packet 1004 and receives a first high priority packet 1006. At 1001, a general processor element re-orders the FIFO buffer to place the first high priority packet 1006 ahead of the first low priority packet 1004 in the FIFO buffer 1102. The FIFO buffer 1002 then receives a second high priority packet 1008. At 1003, based on the respective priorities of the packets, the general processor element re-orders the FIFO buffer to place the second high priority packet 1008 ahead of the first low priority packet 1004 and behind the first high priority packet 1006. The FIFO buffer 1002 then receives a second low priority packet 1010. At 1005, based on the respective priorities of the packets, the general processor element does not re-order the FIFO buffer and places the second low priority packet 1010 and behind the first low priority packet 1004. In response to the second low priority packet 1010 occupying the last packet slot, the FIFO buffer 1002 may assert an indication that it is full and cannot accept another IPI packet. As such, when a third low priority packet 1012 arrives, the IPI switch can attempt re-routing or delivery to another FIFO buffer of a next general processor element in a group or pipeline stage.

Techniques of a Pipelined Processor Architecture

The following discussion describes techniques for implementing a pipelined processor with configurable grouping of processor elements in accordance with one or more aspects. These techniques may be implemented using any of the environments and entities described herein, such as the firmware 132, pipelined processor 134, processor elements 136, hardware accelerators 306, IPI switch 314, and/or other components of the pipelined processor architecture 302. These techniques include various methods illustrated in FIG. 11 through FIG. 16, each of which is shown as a set of operations that may be performed by one or more entities.

These methods are not necessarily limited to the orders of operations shown in the associated figures. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, the methods may be combined to implement a pipelined processor with stages of grouped processor elements that are configured to implement respective functions for processing commands or information of a storage controller to enable storage media access or other data processing functionalities, such as encryption, error correction, error coding, or the like. In portions of the following discussion, reference will be made to the operating environment 100 of FIG. 1 and various entities or configurations of FIG. 2 through FIG. 10 by way of example. Such reference is not to be taken as limiting described aspects to the operating environment 100, entities, or configurations, but rather as illustrative of one of a variety of examples. Alternately or additionally, operations of the methods may also be implemented by or with entities described with reference to the System-on-Chip of FIG. 17 or the storage system controller of FIG. 18.

FIG. 11 depicts an example method 1100 for grouping processor elements to form stages of a pipelined processor, including operations performed by firmware 132 or manager of a storage media controller.

At 1102, firmware of a storage controller selects a first group of processor elements from a plurality of processor elements to form a first stage of a pipelined processor. The firmware may select the first group of processor elements based on an estimated or projected operational value and an operational target operational parameter for the first stage. For example, the firmware may divide a total amount of time consumed per processor element to perform the functions of the pipeline stage by a target throughput time for the pipeline stage to determine how many processor elements to assign to the stage. Alternatively or additionally, the firmware may access historical records of host command traffic patterns to determine how many processor elements to allocate to the first stage of the pipeline. In some cases, the firmware may consult an machine learning model to determine whether to increase or decrease the number of processor elements based on data from previous configurations of the pipelined processor.

At 1104, the firmware selects a second group of processor elements from the plurality of processor elements to form a second stage of the pipelined processor. The firmware may select the second group of processor elements similarly to operation 1102, such as based on a target parameter for the pipeline stage, such as throughput, duration of time, latency, bandwidth, or the like. Alternatively or additionally, the firmware may access historical records of host command traffic patterns to determine how many processor elements to allocate to the second stage of the pipeline.

At 1106, the firmware loads microcode to the first group of processor elements to configure the first stage to implement a first function of the pipelined processor. The microcode may include a first section or first sequence of microcode configured to enable the processor elements of the first group to implement first command processing functions of the first stage of the pipelined processor.

Optionally at 1108, the firmware loads other microcode to the second group of processor elements to configure the second stage to implement a second function of the pipelined processor. The other microcode may include a second section or second sequence of microcode configured to enable the processor elements of the second group to implement second command processing functions of the second stage of the pipelined processor. Alternatively, the second group of processors may include one or more task specific processor elements that are preconfigured to implement respective functions for processing the host commands. After grouping and configuration of the stages of the pipelined processor are complete, the pipelined processor may receive host commands from firmware or a host controller for processing as described throughout the disclosure.

FIG. 12 depicts an example method 1200 for grouping processor elements of pipeline processor stages based on a target operational parameter of the pipelined processor, including operations performed by firmware 132 or manager of a storage media controller.

At 1202, the firmware of a storage controller determines a target operational parameter of a pipelined processor. For example, the firmware may determine that a target processing time for the pipelined processor, and therefore each stage of the processor, is a specific duration of time. Any suitable operational parameter may be used to specify target pipeline or stage performance, such as delay, latency, bandwidth, throughput, or the like.

At 1204, the firmware determines, for a stage of the pipelined processor, a stage-specific operational parameter value associated with performing a processing function of the stage. In some cases, the firmware estimates an amount of time or delay associated with a processor element performing one or more processing functions of the stage. By way of example, consider the stages 602 as described with reference to FIG. 6.

At 1206, the firmware determines, based on the stage-specific operational parameter value, a number of processor elements to group to perform the processing function of the stage. Generally, the firmware may use a ratio of the stage-specific operational parameter and the target operational parameter for the stage to determine the number of processor elements to assign to the stage. For example, if functions of a stage consume 800 ns of processing time with one processor element and the target time per stage is 200 ns, the firmware can determine to assign four processor elements to the stage such that a command is processed by a processor element of the stage every 200 ns.

At 1208, the firmware groups the determined number of processor elements to form the stage of the pipelined processor effective to configure the stage to operate at the target operational parameter of the pipelined processor. As described with reference to FIGS. 5 and 6, the firmware may assign a group ID to the processor elements assigned to the stage of the pipelined processor. Based on the group ID, the firmware may load microcode to processor elements of the stage to configure the stage to perform the functions for processing the host commands. Optionally, from operation 1208, the method 1200 may return to operation 1204 to configure additional stages of the staged pipeline or reconfigure a stage of the staged pipeline. For example, the firmware may redetermine a bandwidth parameter, a throughput parameter, a latency parameter, or a timing parameter of the stage and then alter a number of processors in the group assigned to the stage of the pipelined processor. By so doing, the firmware may adapt to changes in host command traffic patterns on the fly, which may prevent bottlenecks in the pipelined processor when one stage becomes congested and backpressures other stages.

FIG. 13 depicts an example method 1300 for routing inter-processor packets of a pipelined processor between processor elements or other components of a storage controller. The operations of the method 1300 may be implemented by the pipelined processor 134, processor elements 136, IPI switch 314, general processor elements 402, specific processor elements 404, or other entities of a storage controller.

At 1302, an inter-processor interaction (IPI) switch receives, from an output buffer of a processor element, an indication that a packet is queued for routing. For example, a general processor element may construct an IPI packet and load the IPI packet into an output buffer, which may initiate an alert or doorbell notifying the IPI switch that the packet is ready. Alternatively, the output buffer may transmit the IPI packet to input buffer of the IPI switch for routing. As described herein, the IPI packet may include a header field with routing information for the IPI packet useful by the IPI switch for routing the IPI packet to a group processor elements or hardware accelerator.

At 1304, the IPI switch queries statuses of respective input buffers of multiple processor elements associated with a processor element group identifier to which the packet is addressed. Alternatively, the switch queries statuses of respective input buffers of multiple processor elements of a processing stage or processing function to which the packet is addressed. In some cases, the input buffers of one or more of the destination processor elements may be full and prevented from receiving additional IPI packets until the processor element processes queued IPI packets from the input buffer.

At 1306, the IPI switch queries available depth from the respective input buffers of the multiple processor elements. In some cases, the IPI switch may determine, from among input buffers that are not full, which of the input buffers has a greater depth or is less full than the others. By so doing, the IPI switch may route the IPI packet to an input buffer that is empty or low, such that the IPI packet is processed more quickly.

At 1308, the IPI switch selects one of the multiple processor elements as a destination for the packet based on the respective status and/or available depth of the respective input buffers of the multiple processor elements. The IPI switch may select any of the processor elements with an open packet slot as the destination for the IPI packet. As noted, however, the IPI switch may select the processor element having the input buffer with the most availability, which may be effective to balance loading or distribution of IPI packets to the processor elements of the group.

At 1310, the IPI switch routes the packet from the output buffer of the processor element to the input buffer of the selected processor element associated with the processor element group identifier. By way of example, the IPI switch may route the IPI packet as described with reference to FIG. 5, in which the IPI switch may be configured to route IPI packets to different types of processor elements or hardware accelerators.

FIG. 14 depicts an example method 1400 for configuring a group allocation table to allocate numbers of processor elements to respective processing groups of a pipelined processor. The operations of the method 1400 may be implemented by or performed with the firmware 132 or group allocation table 502.

At 1402, firmware of a storage controller determines numbers of processor elements to assign as groups of processor elements to respective stages of a pipelined processor. For example, the firmware may determine the numbers of processor elements to assign to each stage of the pipelined processor as described with reference to FIG. 6 or the method 1200.

At 1404, the firmware configures a starting group index value in a group allocation table for the processor elements of the pipelined processor. The starting group index value may be zero or non-zero, which enables some of the processor elements to not be allocated. By way of example, consider the group allocation table 502 as described with reference to FIG. 5 and the three processor elements not grouped or allocated by using 3 h as a starting group index.

At 1406, the firmware configures, as an offset from the starting group index value, a group index value for a number of processor elements to group for one of the respective stages of the pipelined processor. By way of example, consider the group ID 0 of FIG. 5, which is set to one processor element by setting a next value in the group allocation table to 4 h.

At 1408, the firmware configures, as another offset from a preceding group index value, another group index value for another number of processor elements to group for a next one of the respective stages of the pipelined processor. As an example, the firmware sets a next value in the group allocation table of FIGS. 5 to 7h to allocate three processor elements to group ID 1. From operation 1408, the method 1400 may proceed to operation 1410 to complete the grouping process or may repeat any suitable number of times to form additional groupings of processor elements.

At 1410, the firmware configures, same as a preceding group index value, a final group index value to indicate completion of the grouping of processor elements. By so doing, the firmware allocates zero processor elements to the group ID associated or defined by the final group index value. Alternatively or additionally, the firmware may set the group index value to all Is to indicate the end of the group allocations. By way of example, consider the group IDs 4 and 5 of FIG. 5, which are set to Fh indicating that these group IDs are not used.

At 1412, the firmware allocates, from a plurality of processor elements, the number of processor elements indicated by the group allocation table to the groups of processor elements in the respective stages of the pipelined processor. Concluding the present example, the firmware configures the groups of the processor elements and may then load corresponding microcode to each of the groups to initialize the processor elements for host command processing.

FIG. 15 depicts an example method 1500 for constructing inter-processor interaction packets in accordance with one or more aspects. The operations of the method 1500 may be implemented by the pipelined processor 134, processor elements 136, IPI switch 314, general processor elements 402, specific processor elements 404, or other entities of a storage controller.

At 1502, a processor element configures or inserts a command index in a header of a packet to be processed. In some cases, the packet is an IPI packet to be transmitted to an IPI switch for routing to another processor element. Generally, the processor element may construct an IPI packet that includes a header and payload, such as described with reference to FIG. 9. The header of the IPI packet may include the command index, an execution group identifier, a routing group identifier, and/or an execution instruction pointer. Thus, at 1504, the processor element configures or inserts an execution group identifier to the header of the packet. The processor element then configures or inserts at 1506 a routing group identifier to the header of the packet. At 1508, the processor element configures or inserts an instruction pointer of the header of the packet, which may complete construction of the header of the IPI packet. The processor element may also form a payload of the IPI packet with any suitable information to be delivered to a processor element or other component.

Optionally at 1510, an input/output management field of the packet is set to select to use an alternative command index, execution group identifier, routing group identifier, or instructions pointer. By so doing, an IPI can be routed to a different destination, associated with a different command index, returned to a different processor element, and so forth. At 1512, the processor element sends the packet to an output buffer of a processor element for routing by an inter-processor switch based on the header of the packet.

FIG. 16 depicts an example method 1600 for managing packet flow through an input buffer in accordance with one or more aspects. The operations of the method 1600 may be implemented by the pipelined processor 134, processor elements 136, IPI switch 314, general processor elements 402, specific processor elements 404, or other entities of a storage controller.

At 1602, firmware configures an input buffer of a processor element of a pipelined processor with a reserve area for packets with a first priority. For example, the firmware may configure a number of packet slots as a reserve area for urgent or high priority packets.

Optionally at 1604, the firmware configures the input buffer of the processor element of a pipelined processor with a shared area for packets with a second priority. In some cases, the firmware may explicitly allocate a number of packet slots of the input buffer as shared packet slots for packets of any priority. Alternatively, any unconfigured or unassigned packet slots of the input buffer may default to shared packet slots that may receive packets of any priority.

At 1606, the input buffer of the processor element receives a packet from an inter-processor switch of the pipelined processor. When received, input buffer logic or a processor element may determine a priority of the packet and compare that priority with respective priorities of other packets occupying the input buffer.

Optionally at 1608, the input buffer reorders the packet and other packets in the input buffer based on respective priorities of the packet and other packets. For example, based on the comparison of priorities, the input buffer or processor element may place a newly received packet with higher priority closer to a head of the input buffer, which may displace lower priority packets.

At 1610, the input buffer updates a counter of the input buffer for tracking availability of the reserved area and/or the shared area of the input buffer. In some cases, logic associated with the input buffer updates the counter of the input buffer for tracking the available capacity of the input buffer. At 1612, the input buffer indicates a status of the input buffer to the inter-processor switch based on the counter of the input buffer or a state of the input buffer (active/idle). From operation 1612, the method 1600 may return to operation 1606 to receive another packet or proceed to operation 1614 when the counter of the input buffer indicates that the input buffer is full or that a shared area of the input buffer is full.

At 1614, the input buffer is prevented from receiving another packet from the IPI switch based on the status of the input buffer. In some cases, the shared area of the input buffer may be full and the input buffer may be prevented from receiving non-urgent packets. Thus, the input buffer may maintain open reserved packet slots for any urgent packets sent by the IPI switch. By so doing, the input buffer may ensure that the processor element continues to process urgent or high priority packets, which may prevent congestion or improve performance of low latency command processing functions.

System-on-Chip and Controller

Figure 17:
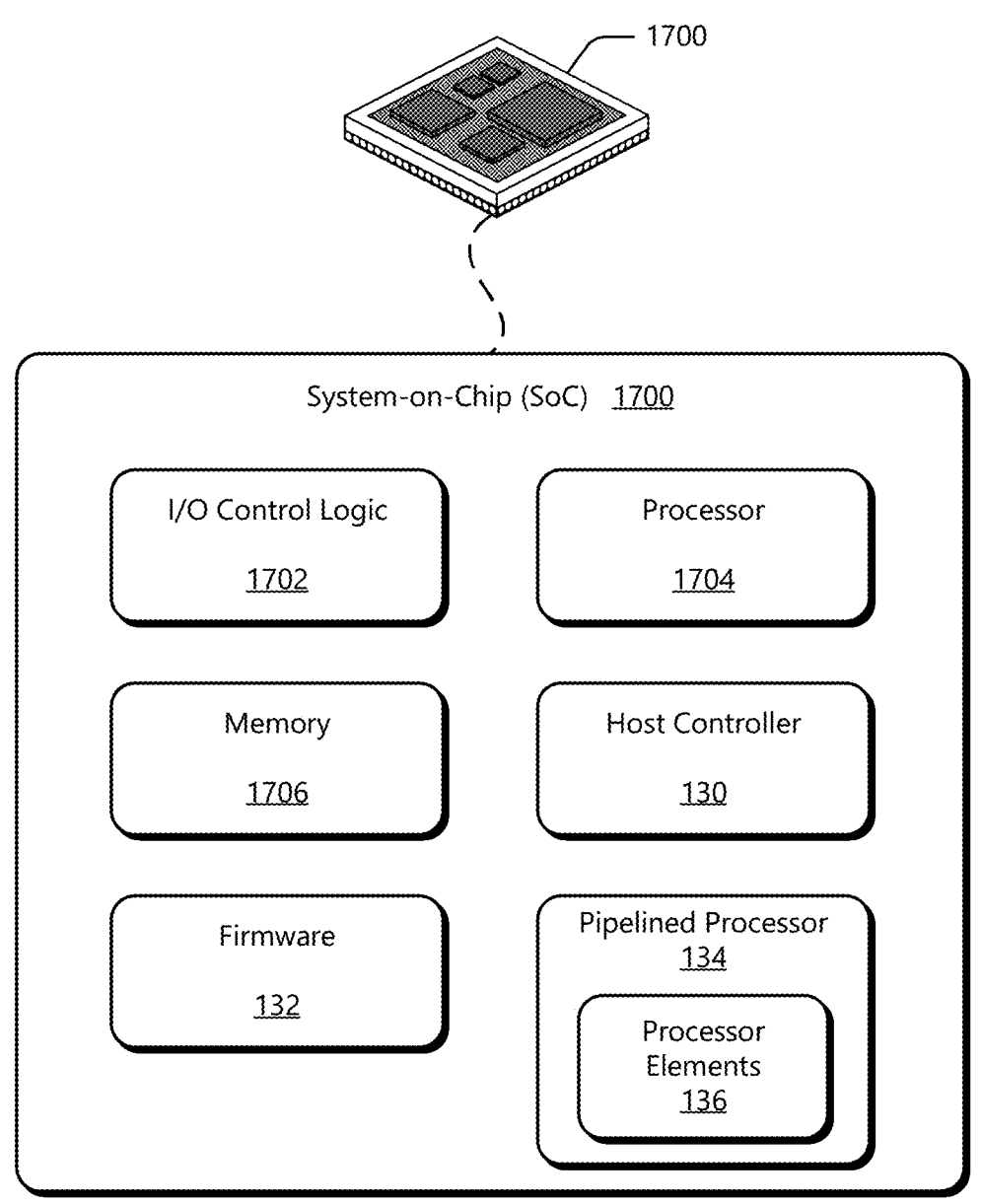
FIG. 17 illustrates an example System-on-Chip (SoC) environment in which aspects of a pipelined processor architecture with configurable grouping of processor elements may be implemented.

FIG. 17 illustrates an example System-on-Chip (SoC) 1700 environment in which various aspects of a pipelined processor with configurable grouping of processor elements may be implemented. The SoC 1700 may be implemented in any suitable system or device, such as a smart-phone, netbook, tablet computer, access point, network-attached storage, camera, smart appliance, printer, set-top box, server, data storage center, solid-state drive (SSD), hard disk drive (HDD), storage drive array, memory module, automotive computing system, aggregate storage controller, or any other suitable type of device (e.g., others described herein). Although described with reference to a SoC, the entities of FIG. 3 may also be implemented as other types of integrated circuits or embedded systems, such as an application-specific integrated-circuit (ASIC), memory controller, storage controller, communication controller, application-specific standard product (ASSP), digital signal processor (DSP), programmable SoC (PSoC), system-in-package (SiP), or field-programmable gate array (FPGA).

The SoC 1700 may be integrated with electronic circuitry, a microprocessor, memory, input-output (I/O) control logic, communication interfaces, firmware, and/or software useful to provide functionalities of a computing device, host system, or storage system, such as any of the devices or components described herein (e.g., storage drive or storage array). The SoC 1700 may also include an integrated data bus or interconnect fabric (not shown) that couples the various components of the SoC for control signaling, data communication, and/or routing between the components. The integrated data bus, interconnect fabric, or other components of the SoC 1700 may be exposed or accessed through an external port, parallel data interface, serial data interface, fabric-based interface, peripheral component interface, or any other suitable data interface. For example, the components of the SoC 1700 may access or control external storage media, solid-state storage media, Flash memory media, magnetic disk media, through an external interface or off-chip data interface.

In this example, the SoC 1700 includes various components such as input-output (I/O) control logic 1702 and a hardware-based processor 1704 (processor 1704), such as a microprocessor, processor core, application processor, DSP, or the like. The SoC 1700 also includes memory 1706, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 1704 and code stored on the memory 1706 are implemented as a storage system controller or storage aggregator configured to implement aspects of a pipelined processor with configurable grouping of processor elements. In the context of this disclosure, the memory 1706 stores data, code, instructions, firmware (e.g., firmware 132), or other information via non-transitory signals, and does not include carrier waves or transitory signals. Alternately or additionally, SoC 1700 may comprise a data interface (not shown) for accessing additional or expandable off-chip storage media, such as solid-state memory (e.g., Flash or NAND memory), magnetic-based memory media, or optical-based memory media.

The SoC 1700 may also include firmware 132, applications, programs, software, and/or operating system, which may be embodied as processor-executable instructions maintained on the memory 1706 for execution by the processor 1704 to implement functionalities of the SoC 1700. The SoC 1700 may also include other communication interfaces, such as a transceiver interface for controlling or communicating with components of a local on-chip (not shown) or off-chip communication transceiver. Alternately or additionally, the transceiver interface may also include or implement a signal interface to communicate radio frequency (RF), intermediate frequency (IF), or baseband frequency signals off-chip to facilitate wired or wireless communication through transceivers, physical layer transceivers (PHYs), or media access controllers (MACs) coupled to the SoC 1700. For example, the SoC 1700 may include a transceiver interface configured to enable storage over a wired or wireless network, such as to provide a network attached storage (NAS) volume manageable by a storage controller that includes a pipelined processor with configurable grouping of processor elements.

The SoC 1700 also includes a host controller 130 and a pipelined processor 134, which may be implemented with a plurality of processor elements 136 as described herein to implement groups of processor elements to form a stage pipeline for processing data or other commands. In accordance with various aspects of a pipelined processor with configurable grouping of processor elements, the pipelined processor 134 may interact with the firmware 132 and host controller 130, which may offload or assign commands or data to the pipelined processor 134 or hardware accelerators (not shown) for processing. Any of these entities may be embodied as disparate or combined components, as described with reference to various aspects presented herein. Examples of these components and/or entities, or corresponding functionality, are described with reference to the respective components or entities of the operating environment 100 of FIG. 1 or respective configurations illustrated in FIG. 2 through FIG. 10, the methods depicted in FIG. 11 through FIG. 16, and/or throughout this disclosure. The pipelined processor 134, either in whole or part, may be implemented as groups of processor elements 136 configured to execute respective processor-executable instructions (e.g., microcode) maintained by the memory 1706 and executed by the processor 1704 and/or processor elements 136 to implement various aspects and/or features of a pipelined processor with configurable grouping of processor elements. The pipelined processor 134 and/or processor elements 136, may be implemented independently or in combination with any suitable component or circuitry to implement aspects described herein. For example, the pipelined processor 134 or processor elements 136 may be implemented as part of a DSP, processor/storage bridge, I/O bridge, graphics processing unit, memory controller, storage controller, arithmetic logic unit (ALU), or the like. The pipelined processor 134 may also be provided integral with other entities of SoC 1700, such as integrated with the processor 1704, memory 1706, a storage media interface, or firmware 132 of the SoC 1700. Alternately or additionally, the pipelined processor 134, processor elements 136, hardware accelerators, IPI switch (not shown), and/or other components of the SoC 1700 may be implemented as hardware, firmware, fixed logic circuitry, or any combination thereof.

Figure 18:
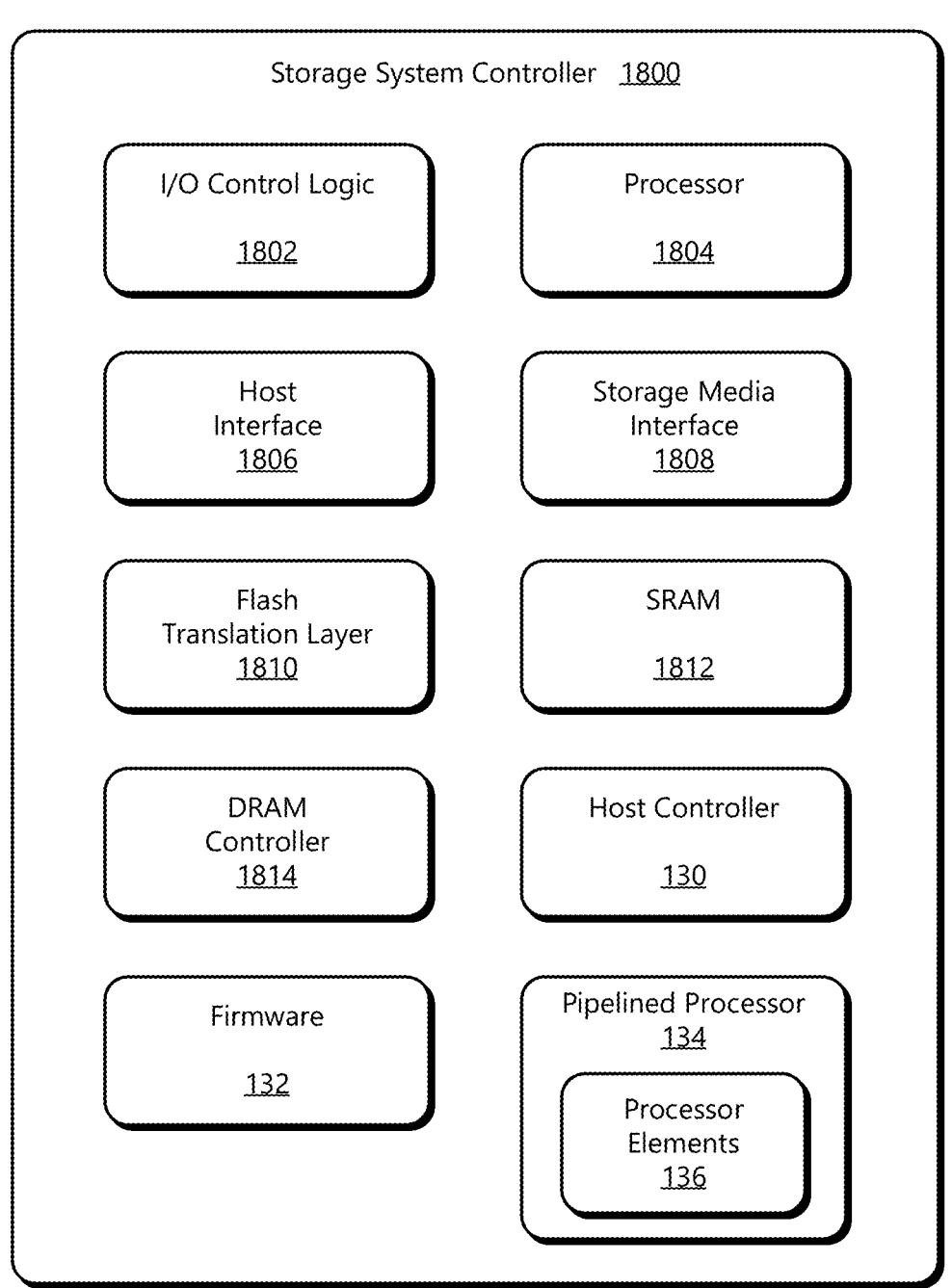
FIG. 18 illustrates an example storage system controller in which a pipelined processor architecture with configurable grouping of processor elements is implemented in accordance with one or more aspects of the disclosure.

As another example, consider FIG. 18 which illustrates an example storage system controller 1800 in accordance with one or more aspects of a pipelined processor with configurable grouping of processor elements. In various aspects, the storage system controller 1800 or any combination of components thereof may be implemented as a storage drive controller, distributed storage center controller (e.g., among a host and SSDs), storage media controller, NAS controller, Fabric interface, NVMe target, or storage aggregation controller for solid-state storage media. In some cases, the storage system controller 1800 is implemented similar to or with components of the SoC 1700 as described with reference to FIG. 17. In other words, an instance of the SoC 1700 may be configured as a storage system controller, such as the storage system controller 1800 to manage solid-state media (e.g., NAND Flash) with machine learning for optimized data placement and access.

As shown in FIG. 18, the storage system controller 1800 includes input-output (I/O) control logic 1802 and a processor 1804, such as a microprocessor, processor core, application processor, DSP, or the like. In some aspects, the processor 1804 and firmware 132 of the storage system controller 1800 may be implemented to provide various functionalities associated with a pipelined processor with configurable grouping of processor elements, such as any described in this disclosure. The storage system controller 1800 also includes a host interface 1806 (e.g., SATA, PCIe, NVMe, or Fabric interface) and a storage media interface 1808 (e.g., NAND interface), which enable access to a host system and storage media, respectively. The storage system controller 1800 also includes a Flash translation layer 1810 (FTL 1810), SRAM 1812, and DRAM controller 1814. In some aspects of a pipelined processor with configurable grouping of processor elements, the FTL 1810 interacts with a pipelined processor 134 and/or processor elements 136 to process commands, tasks, or other data, which may be offloaded to stages of the pipelined processor 134 by the firmware 132 or host controller 130.

In this example, the storage system controller 1800 also includes instances of the host controller 130, firmware 132 of the controller, and a pipelined processor 134 that includes multiple processing stages formed with groups of the processor elements 136. Any or all of these components may be implemented separately as shown or combined with the processor 1804, host interface 1806, storage media interface 1808, Flash translation layer 1810, SRAM 1812, DRAM controller 1814, and/or hardware accelerators as described throughout this disclosure. Examples of these components and/or entities, or corresponding functionality, are described with reference to the respective components or entities of the operating environment 100 of FIG. 1 or respective configurations illustrated in FIG. 2 through FIG. 10, the methods depicted in FIG. 11 through FIG. 16, and throughout the disclosure. In accordance with various aspects of a pipelined processor with configurable grouping of processor elements for processing storage media data or commands, the pipelined processor 134 may interact with the host controller 130 or firmware 132 to receive configuration parameters, reconfiguration parameters, data, commands, packets, or other tasks for processing. Alternately or additionally, the processor elements 136 may be grouped and/or configured as described throughout this disclosure to implement one or more staged pipelines for processing commands or data associated with enable storage media access, management, or internal tasks of the storage controller 1800. The pipelined processor 134, either in whole or part, may be implemented as processor elements 136, hardware accelerators, or other processing units configured to execute processor-executable instructions (e.g., microcode) maintained by memory of the controller or other entities of the controller to implement various aspects and/or features of a pipelined processor with configurable grouping of processor elements for processing storage media commands, data, or tasks.

In the following, some examples of a pipelined processor with configurable grouping of processor elements are described in accordance with one or more aspects:

Example 1: An apparatus comprising a host interface configured for communication with a host system, a media interface configured to enable access to storage media, and a plurality of processor elements operably coupled to at least one of the host interface and the media interface, the plurality of processor elements organized into multiple stages of a pipelined processor for processing data access commands associated with the host system, at least two of the multiple stages being configured to implement a different function to process the data access commands.

Example 2: The apparatus of example 1, wherein the plurality of processor elements comprises multiple task specific processor elements that are preconfigured to implement respective ones of the different functions for processing the data access commands or other commands of the apparatus.

Example 3: The apparatus of example 1 or example 2, wherein the plurality of processor elements comprises general purpose processor elements that are configurable to implement respective ones of the different functions for processing the data access commands or other commands of the apparatus.

Example 4: The apparatus of example 3, further comprising a memory storing processor-executable instructions, the processor-executable instructions comprising multiple portions of microcode useful to configure the general purpose processor elements to implement the respective functions of at least some of the multiple stages for processing the data access command or the other commands of the apparatus.

Example 5: The apparatus of any one of examples 1 to 4, wherein each of the multiple stages of the pipelined processor comprise at least one of the processor elements, and each of the multiple stages of the pipelined processor is identifiable or addressable by a respective processor element group identifier assigned to the at least one of the processor elements of a corresponding one of the multiple stages.

Example 6: The apparatus of any one of examples 1 to 5, wherein a number of the plurality of processor elements is different from a number of the multiple stages of the pipelined processor.

Example 7: The apparatus of any one of examples 1 to 6, wherein at least one of the multiple stages of the pipelined processor comprises at least two processor elements of the plurality of processor elements of the apparatus.

Example 8: The apparatus of any one of examples 1 to 7, further comprising an inter-processor switch that operably couples the plurality of the processor elements in a star topology in which the processor elements of each of the multiple stages communicate with respective processor elements of others of the multiple stages through the inter-processor switch.

Example 9: The apparatus of claim 8, wherein the inter-processor switch is operably coupled to each processor element of the plurality of processor elements and enables a processor element to communicate an inter-processor packet with any other processor element of the plurality of processor elements based on a group identifier assigned to the processor elements of the stage into which the other processor element is organized.

Example 10: The apparatus of claim 9, wherein the inter-processor switch is configured to route inter-processor packets between respective processor elements of the multiple stages of the pipelined processor based on the group identifier assigned to the respective processor elements of each stage of the multiple stages of the pipelined processor, the routing of the inter-processor packets being agnostic of individual identifiers of the plurality of processor elements.

Example 11: A method for configuring a plurality of processor elements of a storage controller to form a pipelined processor for processing data access commands of a host system or other commands of the storage controller, the method comprising selecting a first group of processor elements of the plurality of processor elements to form a first stage of the pipelined processor, selecting a second group of the processor elements of the plurality of processor elements to form a second stage of the pipelined processor, and loading microcode to the first group of processor elements to configure the first stage of the pipelined processor to implement a first function of the pipelined processor, the first function of the first stage being different from a second function of the second stage.

Example 12: The method of example 9, wherein the second group of processor elements are task specific processor elements that are preconfigured to implement respective functions for processing the data access commands or other commands of the storage controller.

Example 13: The method of example 9 or example 10, wherein the microcode is first microcode, the second group of processor elements are general purpose processor elements, and the method further comprises loading second microcode to the second group of processor elements to configure the second stage of the pipelined processor to implement the second function of the pipelined processor.

Example 14: The method of any one of examples 9 to 11, further comprising determining one of a bandwidth parameter, a throughput parameter, a latency parameter, or a timing parameter of the pipelined processor, and wherein the selecting of the first group of processor elements comprises selecting a number of the plurality of the processor elements to include in the first group based on the bandwidth parameter, the throughput parameter, the latency parameter, or the timing parameter, or the selecting of the second group of processor elements comprises selecting a number of the plurality of the processor elements to include in the second group based on the bandwidth parameter, the throughput parameter, the latency parameter, or the timing parameter.

Example 15: The method of example 12, further comprising redetermining one of the bandwidth parameter, the throughput parameter, the latency parameter, or the timing parameter of the pipelined processor, and altering the number of the plurality of the processor elements included in the first group based on the redetermined bandwidth parameter, the redetermined throughput parameter, the redetermined latency parameter, or the redetermined timing parameter, or altering the number of the plurality of the processor elements included in the second group based on the redetermined bandwidth parameter, the redetermined throughput parameter, the redetermined latency parameter, or the redetermined timing parameter.

Example 16: The method of example 12, further comprising evaluating performance of the first stage or the second stage of the stage pipeline in relation to the bandwidth parameter, the throughput parameter, the latency parameter, or the timing parameter of the pipelined processor, and altering the number of the plurality of the processor elements included in the first group based on the performance of the first stage of the pipelined processor, or altering the number of the plurality of the processor elements included in the second group based the performance of the second stage of the pipelined processor.

Example 17: The method of any one of examples 9 to 14, further comprising assigning a first group identifier to the first group of processor elements of the first stage to enable identification, addressing, or interaction with the first stage of the pipelined processor, or assigning a second group identifier to the second group of processor elements of the second stage to enable identification, addressing, or interaction with the second stage of the pipelined processor.

Although the subject matter of a pipelined processor with configurable grouping of processor elements has been described in language specific to structural features and/or methodological operations, it is to be understood that the subject matter defined in the appended claims is not necessarily limited to the specific examples, features, configurations, or operations described herein, including orders in which they are performed.

What is claimed is:

1. An apparatus comprising:
a host interface configured for communication with a host system;
a media interface configured to enable access to storage media;
a plurality of processor elements operably coupled to at least one of the host interface and the media interface, the plurality of processor elements organized into multiple stages of a pipelined processor for processing data access commands associated with the host system, at least two of the multiple stages being configured to implement a different function to process the data access commands, the plurality of processor elements comprising general purpose processor elements that are configurable to implement respective ones of the different functions for processing the data access commands or other commands of the apparatus; and
a memory storing processor-executable instructions, the processor-executable instructions comprising multiple portions of microcode useful to configure the general purpose processor elements to implement the respective functions of at least some of the multiple stages for processing the data access command or the other commands of the apparatus.

2. The apparatus of claim 1, wherein the plurality of processor elements further comprises multiple task specific processor elements that are preconfigured to implement respective ones of the different functions for processing the data access commands or the other commands of the apparatus.

3. The apparatus of claim 1, wherein one of the multiple stages comprises at least two general purpose processor elements configured with a same portion of microcode of the multiple portions of the microcode, the at least two general purpose processor elements configured to implement a same one of the respective functions for processing the data access command or the other commands of the apparatus.

4. The apparatus of claim 1, wherein:
each of the multiple stages of the pipelined processor comprise at least one of the processor elements; and
each of the multiple stages of the pipelined processor is identifiable or addressable by a respective processor element group identifier assigned to the at least one of the processor elements of a corresponding one of the multiple stages.

5. The apparatus of claim 4, wherein the plurality of processor elements comprises at least one processor element that is not allocated to one of the multiple stages and does not have an assigned group identifier.

6. The apparatus of claim 1, wherein a number of the plurality of processor elements is different from a number of the multiple stages of the pipelined processor.

7. The apparatus of claim 1, wherein at least one of the multiple stages of the pipelined processor comprises at least two processor elements of the plurality of processor elements of the apparatus.

8. The apparatus of claim 1, further comprising an inter-processor switch that operably couples the plurality of the processor elements in a topology in which the processor elements of each of the multiple stages communicate with respective processor elements of others of the multiple stages through the inter-processor switch.

9. The apparatus of claim 8, wherein the inter-processor switch is operably coupled to each processor element of the plurality of processor elements and enables a processor element to communicate an inter-processor packet with any other processor element of the plurality of processor elements based on a group identifier assigned to the processor elements of the stage into which the other processor element is organized.

10. The apparatus of claim 9, wherein at least one of the processor elements of the plurality of processor elements comprises a first-in, first-out (FIFO) buffer configured to enable re-ordering of the inter-processor packet among other inter-processor packets based on a priority of the inter-processor packet and respective priorities of the other inter-processor packets.

11. The apparatus of claim 9, wherein the inter-processor switch is configured to route inter-processor packets between respective processor elements of the multiple stages of the pipelined processor based on the group identifier assigned to the respective processor elements of each stage of the multiple stages of the pipelined processor.

12. A method for configuring a plurality of processor elements of a storage controller to form a pipelined processor for processing data access commands of a host system or other commands of the storage controller, the method comprising:
selecting a first group of processor elements of the plurality of processor elements to form a first stage of the pipelined processor, the first group of processor elements comprising general purpose processor elements that are configurable to implement functions for processing the data access commands or the other commands of the storage controller;
selecting a second group of the processor elements of the plurality of processor elements to form a second stage of the pipelined processor, and
loading, from a memory storing multiple portions of microcode, one of the multiple portions of the microcode to the first group of processor elements to configure the first stage of the pipelined processor to implement a first function of the pipelined processor, the first function of the first stage being different from a second function of the second stage, the multiple portions of microcode useful to configure the general purpose processor elements of the storage controller to implement respective functions of at least some of stages of the pipelined processor for processing the data access command or the other commands of the storage controller.

13. The method of claim 12, wherein the second group of processor elements are task specific processor elements that are preconfigured to implement the second function of the second stage for processing the data access commands or other commands of the storage controller.

14. The method of claim 12, wherein the portion of microcode comprises a first portion of microcode, the general purpose processor elements of the first group of processor elements comprise first general purpose processor elements, and the method further comprises:
selecting a third group of processor elements of the plurality of processor elements to form a third stage of the pipelined processor, the third group of processor elements comprising second general purpose processor elements that are configurable to implement functions for processing the data access commands or the other commands of the storage controller; and loading a second portion of the multiple portions of microcode to the second group of general purpose processor elements to configure the third stage of the pipelined processor to implement the third function of the pipelined processor.

15. The method of claim 12, further comprising:

determining one of a bandwidth parameter, a throughput parameter, a latency parameter, or a timing parameter of the pipelined processor, and wherein:

the selecting of the first group of processor elements comprises selecting a number of the plurality of the processor elements to include in the first group based on the bandwidth parameter, the throughput parameter, the latency parameter, or the timing parameter; or the selecting of the second group of processor elements comprises selecting a number of the plurality of the processor elements to include in the second group based on the bandwidth parameter, the throughput parameter, the latency parameter, or the timing parameter.

16. The method of claim 15, further comprising:

redetermining one of the bandwidth parameter, the throughput parameter, the latency parameter, or the timing parameter of the pipelined processor; and altering the number of the plurality of the processor elements included in the first group based on the redetermined bandwidth parameter, the redetermined throughput parameter, the redetermined latency parameter, or the redetermined timing parameter; or altering the number of the plurality of the processor elements included in the second group based on the redetermined bandwidth parameter, the redetermined throughput parameter, the redetermined latency parameter, or the redetermined timing parameter.

17. The method of claim 15, further comprising:

evaluating performance of the first stage or the second stage of the stage pipeline in relation to the bandwidth parameter, the throughput parameter, the latency parameter, or the timing parameter of the pipelined processor; and altering the number of the plurality of the processor elements included in the first group based on the performance of the first stage of the pipelined processor; or altering the number of the plurality of the processor elements included in the second group based the performance of the second stage of the pipelined processor.

18. The method of claim 12, further comprising:

assigning a first group identifier to the first group of processor elements of the first stage to enable identification, addressing, or interaction with the first stage of the pipelined processor; or assigning a second group identifier to the second group of processor elements of the second stage to enable identification, addressing, or interaction with the second stage of the pipelined processor.

19. The method of claim 18, further comprising:

communicating an inter-processor packet between the first group of processor elements and the second group of processor elements based on the first group identifier or the second group identifier.

20. The method of claim 19, further comprising:

re-ordering, via a first-in, first-out (FIFO) buffer of a processor element of the first group of processor elements, the inter-processor packet among first other inter-processor packets based on a priority of the inter-processor packet and respective priorities of the first other inter-processor packets; or re-ordering, via a FIFO buffer of a processor element of the second group of processor elements, the inter-processor packet among second other inter-processor packets based on the priority of the inter-processor packet and respective priorities of the second other inter-processor packets.

* * * * *